(12) United States Patent
Kurian et al.

(10) Patent No.: US 10,013,415 B2
(45) Date of Patent: Jul. 3, 2018

(54) SYSTEMS AND METHODS FOR FACILITATING SPOTTING OF WORDS AND PHRASES

(71) Applicant: KEYPOINT TECHNOLOGIES INDIA PVT. LTD., Hyderabad (IN)

(72) Inventors: Prima Dona Kurian, Hyderabad (IN); Sandeep Yelubolu, Hyderabad (IN); Sumit Goswami, Hyderabad (IN); Sunil Motaparti, Hyderabad (IN)

(73) Assignee: KEYPOINT TECHNOLOGIES INDIA PVT. LTD., Hyderabad (IN)

( * ) Notice: Subject to any disclaimer, the term of this patent is extended or adjusted under 35 U.S.C. 154(b) by 0 days.

(21) Appl. No.: 14/770,139

(22) PCT Filed: Feb. 21, 2014

(86) PCT No.: PCT/IN2014/000113
§ 371 (c)(1),
(2) Date: Aug. 25, 2015

(87) PCT Pub. No.: WO2014/128727
PCT Pub. Date: Aug. 28, 2014

(65) Prior Publication Data
US 2016/0004687 A1 Jan. 7, 2016

(30) Foreign Application Priority Data
Feb. 25, 2013 (IN) .............................. 809/CHE/2013

(51) Int. Cl.
*G06F 17/27* (2006.01)
*G06Q 50/00* (2012.01)

(52) U.S. Cl.
CPC ........ *G06F 17/2735* (2013.01); *G06F 17/277* (2013.01); *G06F 17/2775* (2013.01); *G06Q 50/01* (2013.01)

(58) Field of Classification Search
CPC ............. G06F 17/2735; G06F 17/2775; G06F 17/277; G06Q 50/01
(Continued)

(56) References Cited

U.S. PATENT DOCUMENTS 8,005,720 B2   8/2011   King et al.
2006/0062469 A1   3/2006   Li et al.
(Continued)

*Primary Examiner* — Bharatkumar S Shah
(74) *Attorney, Agent, or Firm* — Benesch, Friedlander, Coplan & Aronoff LLP

(57) ABSTRACT

In accordance with an example embodiment, a system and method for facilitating spotting of words and phrases is disclosed. The system includes a scanning module, a storage module, a computation module, a dictionary generation module and a transceiver module. The scanning module periodically scans a plurality of content sources to identify words and phrases being shared as spots in one or more online communities of remote users. The storage module is configured to store the spots along with information related to the spots. The computation module determines at least one popularity-based metric for each spot stored in the storage module. The dictionary generation module is configured to generate and periodically update a spotting dictionary comprising at least a listing of popular spots based on the at least one popularity-based metric associated with each spot. The transceiver module is configured to provision the spotting dictionary to one or more remote users.

37 Claims, 18 Drawing Sheets

(58) Field of Classification Search
USPC .......................................................... 704/10
See application file for complete search history.

(56) References Cited

U.S. PATENT DOCUMENTS

| | | |
|---|---|---|
| 2007/0288461 A1 | 12/2007 | Burrows et al. |
| 2009/0125521 A1* | 5/2009 | Petty ..................... G06F 21/604 |
| 2010/0100537 A1 | 4/2010 | Druzgalski et al. |
| 2010/0114887 A1* | 5/2010 | Conway ................ G06F 3/0237 |
| | | 707/737 |
| 2010/0216491 A1* | 8/2010 | Winkler ................. G06Q 10/10 |
| | | 455/457 |
| 2012/0226707 A1 | 9/2012 | Brun et al. |
| 2012/0331063 A1 | 12/2012 | Rajaram |
| 2013/0204876 A1 | 8/2013 | Szucs et al. |

* cited by examiner

SYSTEMS AND METHODS FOR FACILITATING SPOTTING OF WORDS AND PHRASES

CROSS-REFERENCE TO RELATED APPLICATIONS

This application claims benefit of Indian Patent Application no. 809/CHE/2013, which was filed on Feb. 25, 2013 and is incorporated herein in its entirety by reference thereto.

FIELD

The present technology generally relates to systems and methods facilitating spotting of words and phrases.

BACKGROUND

Rapid technological advancement in the field of telecommunication has revolutionized a manner in which people communicate with each other. In addition to facilitating oral conversations between remote users, devices such as mobile phones and personal computers are increasingly being equipped with features enabling uninterrupted access to the Internet (or the World Wide Web). An individual may access web-based applications like electronic mail (email) and online chat on the go for initiating text-based communication. Additionally, an individual may also connect with a group of individuals on social networking websites, such as Facebook™ or Twitter™, and may post a comment or tweet a message for group consumption. With increasing usage of text-based communication on such devices, conversational language between users of such devices is also constantly evolving with new words, jargons and/or slangs increasingly being added to conversations on a daily basis. Keeping abreast of latest additions to the conversational language is difficult for users without adequate sharing mechanisms in place. Further, conventional text entry means are rendered outdated and inconvenient to use on account of the constantly evolving conversational language.

SUMMARY

This summary is provided to introduce a selection of concepts in a simplified form that are further described below in the detailed description. This summary is not intended to identify key or essential features of the claimed subject matter, nor is it intended to be used as an aid in determining the scope of the claimed subject matter.

Various systems, methods, and computer readable mediums for facilitating spotting of words and phrases are disclosed. In an embodiment, a system for facilitating spotting of words and/or phrases is disclosed. The system includes a scanning module, a storage module, a computation module, a dictionary module and a transceiver module. In an embodiment, the scanning module is configured to periodically scan a plurality of content sources to identify words and phrases, which are being shared among one or more online communities of remote users as spots. The sharing of a word or a phrase as a spot by a remote user in an online community from among the one or more online communities of remote users is indicative of user interest in the word or the phrase. In an embodiment, the storage module is communicably associated with the scanning module. The storage module is configured to store the spots along with information related to the spots. The information related to the spots includes at least one of identities of remote users from among the one or more online communities of remote users sharing each spot, a contextual information associated with each spot and online user comments associated with each spot. In an embodiment, the computation module is communicably associated with the storage module and configured to determine at least one popularity-based metric for each spot from among the spots stored in the storage module. In an embodiment, the dictionary generation module is communicably associated with the computation module and configured to generate and periodically update a spotting dictionary which includes at least a listing of popular spots based on the at least one popularity-based metric associated with each spot. In an embodiment, the transceiver module is communicably associated with the dictionary module and configured to provision the spotting dictionary to one or more remote users from among the one or more online communities of remote users.

In an embodiment, a communication device configured to facilitate spotting of words and phrases is disclosed. The communication device includes a transceiver, at least one processor and a memory. In an embodiment, the transceiver is configured to communicate with a remote system to receive a spotting dictionary comprising at least a listing of popular spots. In an embodiment, a popular spot from among the popular spots refers to a popular word or a popular phrase of being shared in one or more online communities of remote users. In an embodiment, the at least one processor is communicably associated with the transceiver. In an embodiment, the memory is communicably associated with the transceiver and the at least one processor. The memory is configured to store the spotting dictionary and machine executable instructions therein, that when executed by the at least one processor, causes the device to integrate the spotting dictionary with one or more word dictionaries and facilitate provisioning of the popular spots as word completions, phrase completions, word suggestions, phrase suggestions and next word predictions during instances of user text entry.

In an embodiment, a method for facilitating spotting of words and phrases is disclosed. In an embodiment, the method includes periodically scanning a plurality of content sources to identify words and phrases, which are being shared among one or more online communities of remote users as spots. The sharing of a word or a phrase as a spot by a remote user in an online community from among the online communities of remote users is indicative of user interest in the word or the phrase. The method includes storing the spots along with information related to the spots. The information related to the spots includes at least one of identities of one or more remote users from among one or more online communities of remote users sharing each spot, a contextual information associated with each spot and online user comments associated with each spot. In an embodiment, the method further includes determining at least one popularity-based metric for each spot from among the spots stored in the storage module. The method also includes generating and periodically updating a spotting dictionary comprising at least a listing of popular spots based on the at least one popularity-based metric associated with each spot. Furthermore, the method includes provisioning the spotting dictionary to one or more remote users from among the one or more online communities of remote users.

In an embodiment, a computer-readable medium is disclosed. The computer-readable medium stores a set of computer-readable instructions that when executed by an apparatus causes the apparatus to access a spotting dictionary comprising at least a listing of popular spots, where a popular spot from among the popular spots refers to a popular word or a popular phrase being shared in one or more online communities of remote users. The spotting dictionary is integrated with one or more word dictionaries to facilitate provisioning of the popular spots as word completions, phrase completions, word suggestions, phrase suggestions and next word predictions during instances of user text entry.

In another embodiment, another system for facilitating spotting words and phrases is disclosed. In an embodiment, the system includes means for periodically scanning a plurality of content sources to identify words and phrases, which are being shared among one or more online communities of remote users as spots. The sharing of a word or a phrase as a spot by a remote user in an online community from among the online communities of remote users is indicative of user interest in the word or the phrase. The system includes means for storing the spots along with information related to the spots. The information related to the spots includes at least one of identities of one or more remote users from among one or more online communities of remote users sharing each spot, a contextual information associated with each spot and online user comments associated with each spot. In an embodiment, the system further includes means for determining at least one popularity-based metric for each spot from among the spots stored in the storage module. In an embodiment, the system also includes means for generating and periodically updating a spotting dictionary comprising at least a listing of popular spots based on the at least one popularity-based metric associated with each spot. Furthermore, the system includes means for provisioning the spotting dictionary to one or more remote users from among the one or more online communities of remote users.

In another embodiment, yet another system for facilitating spotting words and phrases is disclosed. In an embodiment, the system includes a scanning module, an application module and a transceiver module. The scanning module is configured to scan one or more user linked accounts corresponding to a remote user from among one or more online communities of remote users for detecting a presence of at least one pre-defined character embedded within textual content corresponding to the one or more user linked accounts. In an embodiment, the application module is communicably associated with the scanning module. The application module is configured to extract a word or a phrase disposed substantially adjacent to the at least one pre-defined character. In an embodiment, the transceiver module is communicably associated with the application module. The transceiver module is configured to provision the word or the phrase for user selection as one of a spot and a re-spot. In an embodiment, the selection of the word or the phrase as the spot is indicative of the user interest in sharing the word or the phrase among the one or more online communities of remote user. In an embodiment, the selection of the word or the phrase as the re-spot is indicative of user interest in sharing a spotted word or spotted phrase by another phrase among the one or more online communities of remote user. In an embodiment, the transceiver module is further configured to facilitate automatic selection of the word or the phrase as one of the spot and the re-spot.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
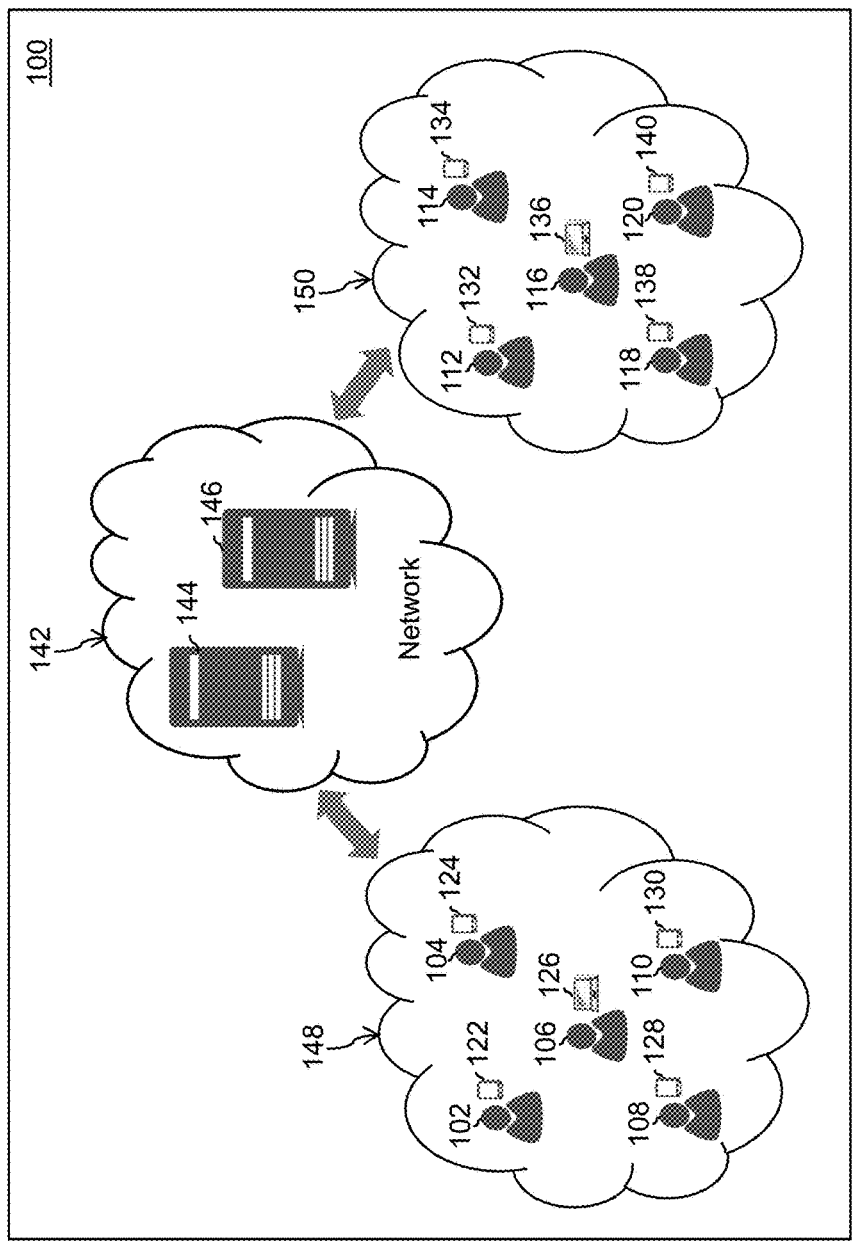
FIG. 1 illustrates an example environment in which various embodiments of the present invention may be practised.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, apparatuses and methods are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Pursuant to an exemplary scenario, text-based user communication is constantly evolving with new words, jargons and/or slangs increasingly being added to conversations on a daily basis. Keeping abreast of latest additions to the conversational language is difficult for users without adequate sharing mechanisms in place. Further, conventional text entry means are rendered outdated and inconvenient to use on account of the constantly evolving conversational language. Various embodiments of the present technology, however, provide systems and methods for facilitating spotting of words and phrases that are capable of overcoming these and other obstacles and providing additional benefits. The term 'spotting of words and phrases' as used herein refers to the act of sharing of words and phrases of interest by a user, with other users. For example, a user may notice an interesting word and/or phrase that he/she comes across during reading a book or surfing the Internet or even communicating via chat or email with friends and may share such interesting words and/or phrases with other users. Alternatively, a user may 'coin' (or define) an interesting new word and/or phrase and subsequently share the coined word or phrase with other users. Accordingly, the spotting of words or phrase implies sharing of words or phrases of user interest with other users. Further, a spotted word or a spotted phrase refers to the shared word or a shared phrase of user interest. The present technology provides various systems and methods for facilitating spotting of words and phrases, which are described herein with reference to FIGS. 1 to 18.

FIG. 1 illustrates an exemplary environment 100 in which various embodiments of the present technology may be practiced. The environment 100 depicts a plurality of users, such as users 102, 104, 106, 108, 110, 112, 114, 116, 118 and 120 located at different geographical locations. It is noted that the terms 'users' or 'remote users' are used interchangeably hereinafter and refer to individuals involved in text-based communication, such as online chatting, emails, posting comments on social networking websites, writing blogs/articles for public consumption and the like. Each user from among the plurality of users is associated with a communication device for facilitating text-based communication. For example, the users 102, 104, 106, 108, 110, 112, 114, 116, 118 and 120 are associated with communication devices 122, 124, 126, 128, 130, 132, 134, 136, 138 and 140, respectively. Examples of communication devices 122-140 associated with the plurality of users may include mobile phones, Smartphones, laptops, personal computers, tablet devices and the like. The communication devices are configured to connect to a communication network 142 (hereinafter referred to as network 142), which facilitates communication among users located at different geographical locations (i.e. remote users). Examples of the network 142 may include wired networks, wireless networks or a combination thereof. Examples of wired networks may include Ethernet, local area network (LAN), fiber-optic cable network and the like. Examples of wireless network may include cellular networks like GSM/3G/CDMA networks, wireless LAN, blue-tooth or Zigbee networks and the like. Examples of combination of wired and wireless networks may include the Internet.

The network 142, in addition to facilitating communication amongst remote users, also provides access to a plurality of web servers hosting content for user consumption, such as web servers 144 and 146. The web servers 144-146 hosting content are hereinafter collectively referred to as plurality of content sources. In some exemplary scenarios, a content source from among the plurality of content sources comprises one of a website, an online social network forum, an e-mail client, a chat client, an e-book, a web page, a text based message, an image file and a video file. The remote users may access a content source from among the plurality of content sources and may contribute to content creation, by engaging in text-based communication, such as for example by posting comments on social networking websites or by participating in web forums.

A remote user may typically engage in text-based communication with one or more other remote users, which may in turn form a social network for the remote user. Such a social network for a remote user constitutes an online community of remote users. It is understood that each remote user within the online community may be associated with his/her own online community of remote users. For example in environment 100, the remote user 102 is communicably associated with remote users 104, 106, 108 and 110. The remote users 104-110 may be one of friends, colleagues, relatives, acquaintances, and business associates with the remote user 102. The group of remote users 102-110 form an online community of remote users 148. The environment 100 depicts another online community of remote users 150 including remote users 112-120 for example purposes. It is understood that each remote user within the online community of remote users may be associated with their own respective social network, which is not shown herein for brevity. Accordingly, the environment 100 includes a plurality of online communities of remote users. The plurality of remote users within the plurality of online communities of remote users engage in web content consumption and text-based communication resulting in further creation of content.

With communication devices increasingly being equipped with messaging applications (for example, chat or email clients, social networking applications and the like) and on-the-go web connection, a volume of text-based communication has increased sizably. With increase in volume of text-based communication, a conversational language associated with the text-based communication between remote users is also constantly evolving with new words, jargons and/or slangs increasingly being added to conversations on a daily basis. Keeping abreast of new word or phrase additions requires mechanisms facilitating spotting of new words and phrases (also referred herein collectively as word spotting mechanisms). A system facilitating spotting of words and phrases is explained with reference to FIG. 2.

Figure 2:
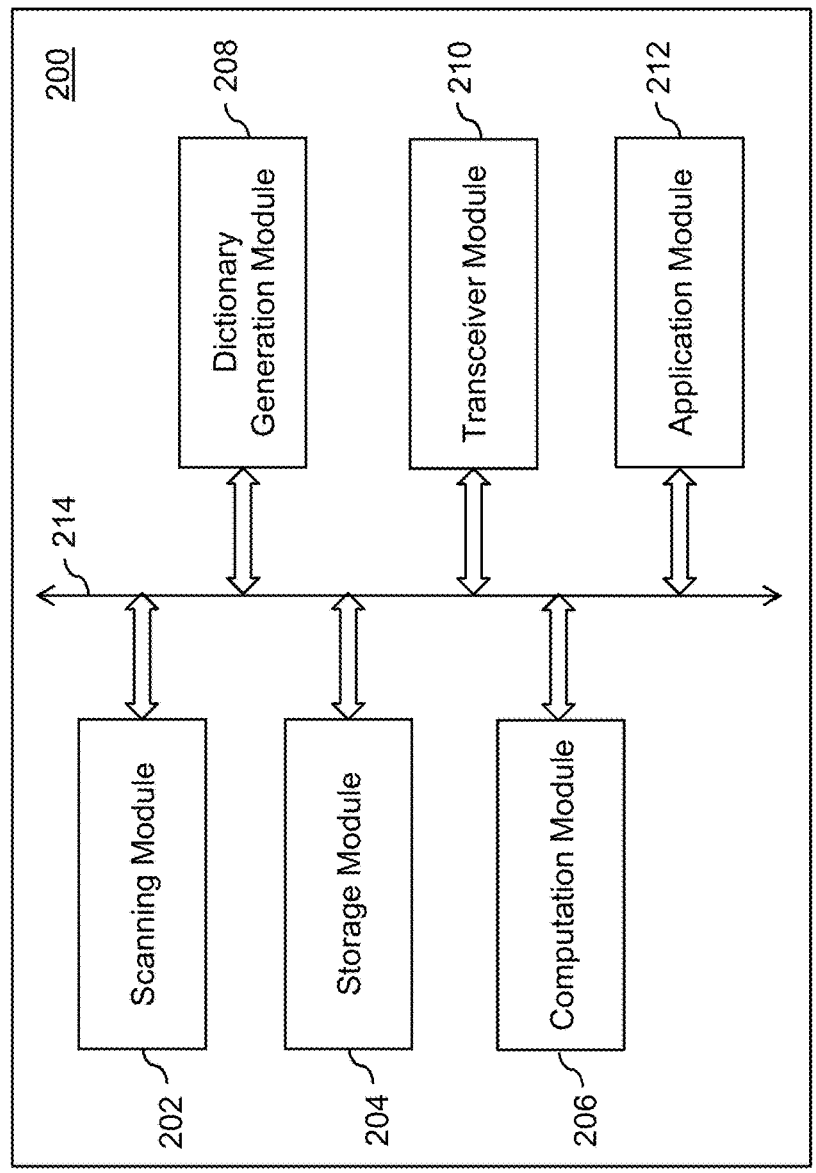
FIG. 2 illustrates a block diagram of a system configured to facilitate spotting of words and phrases in accordance with an embodiment.

Referring now to FIG. 2, a block diagram of a system 200 configured to facilitate spotting of words and phrases is shown in accordance with an embodiment. In an embodiment, the system 200 may be embodied as a web server, such as web servers 144-146 depicted in FIG. 1. In an embodiment, the system 200 includes a scanning module 202, a storage module 204, a computation module 206, a dictionary generation module 208, a transceiver module 210, and an application module 212. The scanning module 202, the storage module 204, the computation module 206, the dictionary generation module 208, the transceiver module 210, and the application module 212 may communicate with each other via bus 214. Examples of the bus 214 may include a data bus, an address bus, a serial bus and the like. It is noted that the system 200 may include fewer or more components and that the components of system 200 are depicted in FIG. 2 for illustrative purposes. In an embodiment, the various components of the system 200, such as the scanning module 202, the storage module 204, the computation module 206, the dictionary generation module 208, the transceiver module 210, the application module 212 and the bus 214 may be implemented as hardware, software, firmware or any combination thereof.

In an example scenario, a remote user notices an interesting word or a phrase and shares it with other remote users as a spot. It is noted herein that sharing a word or a phrase as a spot is indicative of user interest in the word or phrase. In another example scenario, the remote user may coin a new word or a phrase and share it with other remote users as the spot. In an embodiment, the scanning module 202 of the system 200 is configured to periodically scan the plurality of content sources (such as the plurality of content sources explained with reference to FIG. 1) to identify the words or the phrases, which are being shared among one or more online communities of remote users as spots. In an example embodiment, the scanning module 202 may be embodied as a web content crawling mechanism configured to crawl web pages across content sources, such as websites, email clients, chat clients, social networking applications and collate words and phrases being shared as spots. More specifically, it is noted that in some embodiments, the term 'scanning of content sources' refers to crawling of web content with an intention of retrieving words and phrases shared as spots. As explained above, a spot may refer to one of a word or a phrase coined by the remote user, a word or a phrase coined by another remote user in the online community, a word or a phrase encountered online for a first time by the remote user on one of an online content source and an offline content source, and an earlier encountered known word or phrase associated with a new usage for the remote user and the like. In an embodiment, the scanning module 202 is configured to recognize words or phrases shared through a specific medium such as a specific web application (explained later with reference to application module 212) on user communication devices. In an embodiment, the scanning module 202 is configured to scan one or more user linked accounts (also referred herein as user social accounts) corresponding to a remote user from among the one or more online communities of remote users for detecting a presence of at least one pre-defined character embedded within online textual content, and to extract a word or a phrase disposed substantially adjacent to the at least one pre-defined character as a spot (explained later with reference to FIG. 8).

In an embodiment, the scanning module 202 is further configured to periodically scan the plurality of content sources to identify potential spots, where a potential spot corresponds to one of a word and a phrase identified with potential of being shared as a spot by the one or more remote users in the online communities of remote users. For example, the scanning module 202 may perform a standard check of words/phrases encountered during content crawling against a dictionary of known words and phrases and/or the updated version of the spotting dictionary. Upon detecting an absence of an encountered word/phrase in the dictionaries, the scanning module 202 may further subject such a word/phrase to further analysis, such as determining whether the word/phrase corresponds to an acronym, whether the number of characters/letters in the word/phrase are above or below a pre-defined limit or whether the word/phrase corresponds to a known noun form or a short form and the like. Based on such checks, the scanning module 202 may determine a word/phrase to have the potential of being shared as a spot. In an embodiment, the scanning module 202 is configured to identify the potential spot based on related information comprising at least one of temporal and spatial information of content in vicinity of the potential spot, presence of significant words in the content in vicinity of the potential spot, contextual information and semantic sense associated with the potential spot and the associated content, etymological and ontological inferences corresponding to the potential spot, identified sentiment associated with the potential spot, identified context based on grammar extraction corresponding to the potential spot, location source associated with the potential spot and information to qualify and quantify a relevance of the potential spot.

In an embodiment, the storage module 204 is configured to store spots retrieved by the scanning module 202, along with information related to spots. In an embodiment, the information related to the spots includes at least one of identities of remote users from among the one or more online communities of remote users sharing each spot, a contextual information associated with each spot and online user comments associated with each spot. For example, if a spotted word 'Selfie' is shared by ten different remote users, then identities of such users (for example, their name, profile id, contact details and the like) may also be retrieved along with the spotted word by the scanning module 202 and stored in the storage module 204. In an embodiment, the contextual information associated with a spot may include a written description about the spotted word/phrase (for example, including description explaining its intended meaning), a picture or a video of the origin of the word, an exemplary manner of usage and the like. For example, the spotted word 'Selfie' may be associated with a written description, such as follows: 'A Selfie is a type of self-portrait photograph, typically taken with a hand-held digital camera or camera phone'. Further, a remote user spotting the word 'Selfie' may capture an image or a video recording of a content source from where the word was encountered and associate the image/video recording with the spotted word prior to sharing the word. In some embodiments, upon spotting a word by a remote user within his/her online community of remote users, the other remote users may comment on the spotted word. This information may also be captured by the scanning module 202 and stored in the storage module 204 along with the spotted word. Further, the storage module 204 may be configured to store words/phrases retrieved as potential spots along with related information. In some embodiments, the storage module 204 may be embodied as a memory such as, but not limited to, random access memory (RAM), dual port RAM, synchronous dynamic RAM (SDRAM), double data rate SDRAM (DDR SDRAM), and the like.

In an embodiment, the information related to the spots and the related information corresponding to the potential spots stored in the storage module 204 is configured to facilitate in provisioning the one or more remote users with recommendations comprising related spots and related content during instances of user text entry. For example, the system 200 may be configured to facilitate provision of a web browser plug-in, which may be configured to analyze user text entry on an on-going basis and provide recommendations in form of related spots and related content (like relevant blogs, web-links and the like) to the user. For example, if the user is entering a word 'Self' in the web browser text entry box, then in addition to recommending the spot 'Selfie', the browser plug-in may suggest related spots such as 'FBing' (which is similarly prevalent in the social networking space) in addition to web links and/or blogs including related content stored in the storage module 204 in association with the suggested related spots.

In an embodiment, the computation module 206 is configured to determine at least one popularity-based metric for each spot/potential spot stored in the storage module 204. In an embodiment, a popularity-based metric may correspond to a score or a rank indicating a popularity of each spot/potential spot vis-à-vis other spots in the storage module 204. In an embodiment, a separate rank may be computed for categories, such as a demographic based category or a profession-based category, in addition to an overall popularity-based ranking.

In an embodiment, the computation module 206 is configured to compute one or more parameters for each spot. In an embodiment, a parameter from among the one or more parameters is one of: a total number of times a spot is being shared in the one or more online communities of remote users; a total number of separate instances of sharing a spot as a new spot by different remote users within the one or more online communities of remote users; a total number of times a spot is being re-spotted (or re-shared) within the one or more online communities of remote users subsequent to sharing the spot by a remote user; a popularity parameter signifying a measure of popularity of each remote user involved in sharing the spot within the one or more online communities of remote users; a total number of comments associated with the each spot; a total number of recent comments associated with the each spot; a total number of recent re-spots associated with each spot; and a profile parameter configured to account for user additions of at least one of textual content and image content to a spot profile associated with each spot.

In an embodiment, the computation module 206 is configured to perform a normalization of the one or more parameters and compute a weighted average of the normalized one or more parameters to determine the at least one popularity-based metric for the each spot. The normalization of the parameters for determination of the at least one popularity-based metric is exemplarily illustrated with reference to a parameter related to a total number of times a spot was shared in the one or more online communities of remote users as follows: A value corresponding to the total number of times a spot was shared may be associated with each spot. For example, if the spot 'Tryinga' was shared ten times in various online communities, then the value ten may be associated with the spot 'Tryinga'. Similarly, each spot within the storage module 204 may be associated with a value. A maximum of such values may be identified from among all the values associated with various spots stored in the storage module 204. Thereafter, the value associated with each spot may be divided by the identified maximum value to derive a normalized value for each spot. For example, if the spot 'Tryinga' was shared 10 times and a maximum number of shares associated with a spot (for example, 'Selfie') in the storage module 204 is 100, then the normalized value of this particular parameter for the spot 'Tryinga' is 10/100=0.1. The other parameters, such as those listed above, for the spot 'Tryinga' may be normalized in a manner similar to the illustration above. In another illustrative example, say for the current spot, the number of comments of the spot is divided by the number of comments of the spot that is having the maximum comments to get the normalized comments score. Similarly, the number of respots of current spot is divided by the number of respots of the spot that is having the maximum respots to get the normalized respots score. All the normalized parameters may be assigned weights and a weighted average may be computed by the computation module 206 to determine a popularity-based metric for the spot 'Tryinga'. For example, if $P_1 \ldots P_N$ are the various parameters computed by the computation module 206 and $W_1 \ldots W_N$ are the corresponding assigned weights, such that $W_1+W_2+W_3+ \ldots W_N=1$, then the popularity-based metric (S) is computed as depicted in equation (1) below:

$$S=W_1*P_1+W_2*P_2+W_3*P_3+ \ldots W_N*P_N \tag{1}$$

It is noted that the weights $W_1 \ldots W_N$ are introduced to assign priorities to certain parameters while evaluating popularity of the spot. For example, if $W_2$ is the weight assigned to a parameter related to a number of comments for the spot and if $W_3$ is the weight assigned to a parameter related to a recent number of comments for the spot, then $W_3$ may be assigned a higher value than $W_2$ (i.e. $W_3>W_2$) to give more priority to the recent comments the spot has received compared to total number of received comments.

In an embodiment, the popularity-based metric for each spot is computed based on at least one of: (1) a spot profile completeness score (the spot profile is explained later with reference to FIGS. 15 and 16); (2) a maximum spot profile completeness score (3) a number of comments for the spot; (4) a maximum number of comments for spots within the storage module 204; (5) recent number of comments for the spot; (6) maximum number of recent comments for spots within the storage module; (7) number of respots associated with the spot; (8) maximum number of respots for spots within the storage module 204; (9) recent number of respots for the spot; (10) maximum number of recent respots for spots within the storage module 204; (11) number of notes for the spot; (12) maximum number of notes for spots within the storage module 204; (13) recent number of notes for the spot; (14) maximum number of recent notes for spots within the storage module 204; (15) Other or related spots for the spot; and (16) maximum number of other or related spots for spots within the storage module 204. In an embodiment, information retrieved related to the spots/potential spots, such as sentiment, trending context, relevance score of online sources using the spots, a popularity quotient within sub-networks and online sources, temporal and spatial information on online sources or in the spot profile, etymological and/or ontological inferences and the like may also be included as parameters and assigned weights to determine the popularity-based metric for the spots/potential spots.

In an embodiment, the computation module 206 is also configured to determine a spot of the day/week/month/year based on the computed popularity-based metrics for each spot. It is noted that the weights assigned to various parameters may be suitably adjusted for each such determination. For example, the weights associated with recent comments, recent number of respots and the like may be assigned higher weights for determining the spot of the day. In an embodiment, the computation module 206 is also configured to compute a popularity-based metric for each remote user involved in spotting of words and/or phrases (also referred herein as spotters). In an embodiment, the popularity-based metric may be computed based on at least one of: (1) number of spots created by the Spotter in day/week/month; (2) maximum number of spots created by a spotter in day/week/month within all spotters in the storage module 204; (3) average respot score for the spotter; and (4) maximum average respot score within all spotters in the storage module 204. As explained with reference to popularity-based metric for spots, one or more parameters, such as the one cited above may be normalized and a weighted average may be computed to determine the popularity-based metric for each spotter. The spotter associated with the highest popularity-based metric value may be assigned rank 1.

In an embodiment, the dictionary generation module 208 is configured to generate and periodically update a spotting dictionary which includes at least a listing of popular spots based on the at least one popularity-based metric associated with the each spot. For example, of all the spots stored in the storage module 204, the top ten percentile spots with the highest popularity-based metric may be chosen to be included within the spotting dictionary, which serves as a listing of popular spots. It is understood that the example is provided herein for illustration purposes and may not be considered to be limiting. The spotting dictionary may be updated at periodic intervals, such as daily, bi-weekly, weekly, monthly, quarterly or even yearly.

In an embodiment, the transceiver module 210 is configured to provision the spotting dictionary to one or more remote users from among the one or more online communities of remote users. Further, the spotting dictionary is configured to be integrated with one or more word dictionaries within the user's communication device and thereby facilitate provisioning of the popular spots as word completions, phrase completions, word suggestions, phrase suggestions and next word predictions during instances of user text entry. In an embodiment, the spotting dictionary may be configured to present one or more word suggestions/predictions in response to a user character entry on the communication device. In an embodiment, the spotting dictionary may be retained as a stand-alone source for facilitating predictive text entry during textual content input. For example, if the remote user is typing 'Self' in a text editor associated with a text-based application being displayed on a display, then the word 'Selfie' may also be displayed to the remote user as a predictive word (or as a word suggestion). In an embodiment, the user may permit integration of the spotting dictionary for only select text-based applications. In an embodiment, the remote user may also choose to install or uninstall the spotting dictionary from the previously selected text-based applications at any point of time. In an embodiment, the spotting dictionary may also be integrated as a plug-in with Internet applications, search engines, web browsers, blog sites and the like. In an embodiment, such integration may enable the remote users, such as remote users 102-120, to receive spotted words as word suggestions/predictions when searching for results, in-browser texting and the like.

In an embodiment, the spotting dictionary may serve as an additional input source for publicly known online dictionaries, such as Merriam-Webster dictionary, Oxford dictionary and the like. Such dictionary databases may subscribe to receive the spotting dictionary for receiving trending words (i.e. frequently shared spotted words). In an embodiment, the subscription may specify attributes and/or language of trending words to be received. For example, the publicly known online dictionaries may be provisioned with context association, context of use and frequency of usage of trending words along with other information that help refinement of the dictionaries. In an embodiment, the publicly online dictionaries may be revised and/or improved along with other systems like input, lookup, etymology, word mindmap and the like based on the change in meanings/context of the one or more words that happen over time/generations and are captured in the spotting dictionary.

In an embodiment, the dictionary generation module 208 is further configured to frequently analyze the words and/or phrases listed in the spotting dictionary based on a frequency of spotting, context, meaning, timestamp, popularity rank, language, region/location identifiers for the spotted word, etymology and the like. In an embodiment, the dictionary generation module 208 may analyze the spotting dictionary to learn a usage of the spotted words and accordingly increment/decrement attributes associated with the spotted words. For example, a timestamp attribute may be utilized by the dictionary generation module 208 to automatically lower a significance/ranking/frequency/context of those spotted words, which have been frequently spotted and hyped earlier but have become unpopular after a certain period of time. One or more such words may also be pruned from the spotting dictionary and subsequently from the existing word dictionaries. In an embodiment, one or more words may be pruned from the spotting dictionary based on the information provided by the remote users (such as remote users 102-120) corresponding to the one or more spotted words. For example, derogatory words, communal slangs etc. may be pruned from the spotting dictionary either automatically or manually. In an embodiment, the dictionary generation module 208 may also collect data corresponding to the timestamp attribute from the existing word dictionaries included in the communication devices 122-140 corresponding to the remote users 102-120. In another embodiment, the timestamp attribute may be changed along with other attributes manually by any one of linguists and/or the remote users 102-120 to perform a manual check on trending words. In an embodiment, the spotting dictionary is configured to be one of a language specific dictionary and a multi-lingual dictionary.

In an embodiment, the spotting dictionary is configured to include quantitative data and qualitative data corresponding to the popular spots. The usage of quantitative and qualitative data for aiding in text entry is discussed in significant detail in the earlier filed patent application (PCT application no. PCT/GB2005/001111) corresponding to EP Patent no. 1733298, the teachings of which are also incorporated by reference herein. For example, the qualitative data and qualitative data may include statistical information relating to a popular spot's historical usage or selection, probability information relating to a popular spot's historical usage, run-time analytics information and dictionary priority information. In an embodiment, the qualitative data and qualitative data is configured to facilitate in appropriate provisioning of the popular spots as word completions, phrase completions, word suggestions, phrase suggestions and next word predictions during instances of user text entry.

The spotting dictionary, as explained above, may thus serve to keep the plurality of remote users abreast of the latest word or phrase additions to the conversational language. Further, the integration of the spotting dictionary with other dictionaries in the communication device to aid in word completions, word suggestions and next word predictions during instances of user text entry, may assist in keeping the text entry means updated and render it convenient for use in text-based communication vis-à-vis' the latest word or phrase additions to the conversation language.

In an embodiment, the application module 212 is configured to facilitate creation of an interactive web-based application capable of residing natively in a user communication device (also referred herein as user device or an apparatus) associated with a remote user. In an embodiment, the web-based application comprises a plurality of user interfaces (UIs) configured to facilitate a sharing of a word or the phrase as the spot. In an embodiment, one UI from among the plurality of UIs is configured to enable the remote user to provision the word or the phrase of user interest for the subsequent selection of the word or the phrase as the spot. The UI may further be configured to enable the user to add a user-defined snippet for outlining a context of the spot. The UI for facilitating creation of a new spot is explained later with reference to FIG. 6.

In an embodiment, another UI from among the plurality of UIs is configured to display the spot among a listing of words and phrases selected as spots by the remote user. The UI depicting the listing of words and phrases as spots is explained later with reference to FIG. 12. In an embodiment, one or more spots from among the spots selected by the remote user include an associated spot profile in form of user-defined information including at least one of a meaning of the spot, an exemplary spot usage instance and a picture of a location where the spot was first encountered. The spot profile is exemplarily depicted in FIGS. 15 and 16. In an embodiment, the spot profile is configured to display a numeral associated with the spot. The numeral is indicative of a combined count of a number of times the spot was shared as a spot and a re-spot in the one or more online communities of remote users. In an embodiment, the numeral is further configured to include at least one of a number of comments associated with the shared spot, a number of comments associated with the re-spot and a number of instances of adding one of an image, textual content and video with the shared spot or re-spot in the combined count. In an embodiment, the numeral is configured to be displayed as one of a superscript and a subscript to the spot displayed on the spot profile. The numeral associated with the spot in the spot profile is exemplarily depicted in FIG. 16. In an embodiment, the associated spot profile is configured to be edited by other remote users from among the one or more online communities of remote users based on permissions afforded to the other remote users through the web-based application In an embodiment, the web-based application (hereinafter referred to as the application) is configured to provision an option within a set of clipboard options associated with a highlighted portion of text corresponding to one of an online textual content source and an offline textual content source, where the option configured to enable a selection of the highlighted portion of the text as the spot. The provisioning of the option within a set of clipboard options for facilitating selection of the highlighted portion of the text as the spot is explained later with reference to FIG. 7.

In an embodiment, at least one UI from among the plurality of UIs is configured to provision access to one of (1) a listing of currently trending spots among the one or more online communities of remote users and (2) a listing of remote users from among the one or more remote users associated with the currently trending spots. In an embodiment, the at least one UI is further configured to enable the remote user to re-spot a word or a phrase from the listing of currently trending spots, where re-spotting of the word or the phrase is indicative of selecting a spotted word or phrase for subsequent sharing as the spot. The at least one UI may further be configured to enable the remote user to annotate the spots selected by other remote users from among the one or more online communities of remote users with one of comments and tags.

In an embodiment, a UI from among the plurality of UIs is configured to provide alert notifications to the remote user. An alert notification may correspond to an intimation corresponding to at least one of a recently shared spot among the one or more online communities of remote users, a friend approval request from another remote user and a comment or a tag attributed to the spot shared by the remote user. The UI corresponding to the alert notifications is explained later with reference to FIGS. 9, 10 and 11.

In an embodiment, the application is configured to be linked to one or more user accounts on social networking websites (For example, Facebook™, Twitter™, LinkedIn™ and the like) associated with the remote user. In an embodiment, the application is configured to prompt the remote user, during text entry on the one or more user accounts on social networking websites, to append the word or the phase with at least one pre-defined character to indicate a selection of the word or the phrase as the spot. In an embodiment, the application is configured to extract words or phrases appended with at least one pre-defined character within online textual content corresponding to the one or more user accounts on social networking websites and provision the extracted words and phrases as candidates for subsequent selection of the words or the phrases as spots. The linking of user accounts and provisioning extracted words and phrases as candidates for spot selection are explained later with reference to FIGS. 8 and 9, respectively.

Furthermore, the application is configured at least in part, to provision a voice input based option configured to convert one or more words read from a textual content source by the remote user into a textual format for facilitating the sharing of the word or the phrase as the spot. In an embodiment, the application is capable of converting voice input to textual format using standard Speech to Text (STT) tools. Thereafter, the word or the phrase from the converted text may be shared as spot. As explained above, the application is capable of residing natively in a user device (also referred herein as 'communication device' or an 'apparatus'). The application and its associated UIs residing natively in a communication device are explained with reference to FIGS. 3 to 16.

Figure 3:
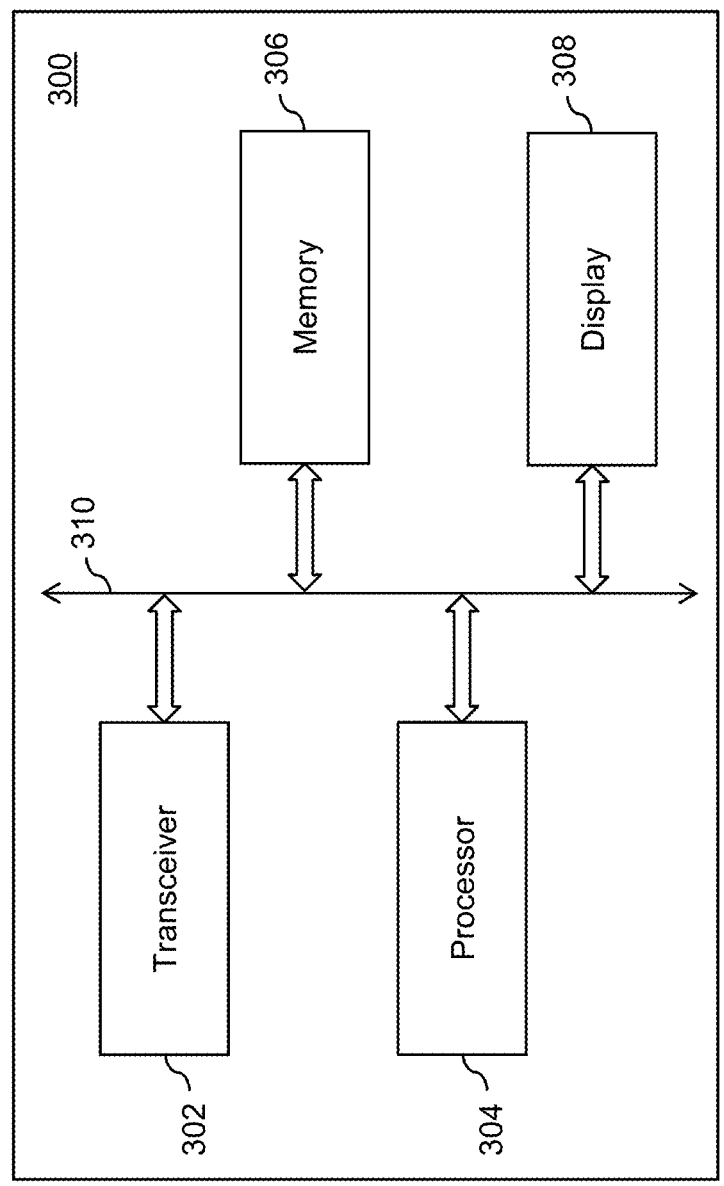
FIG. 3 illustrates a block diagram of a communication device configured to facilitate spotting of words and phrases in accordance with an embodiment.

FIG. 3 illustrates a block diagram of a communication device 300 configured to facilitate spotting of words and phrases in accordance with an embodiment. The communication device 300 may be any one of the communication devices 122-140 explained with reference to FIG. 1. In an embodiment, the communication device 300 may be embodied as one of a mobile phone, a Smartphone, a laptop, a personal computer, a tablet device and the like. The communication device 300 is depicted to include a transceiver 302, a processor 304, a memory 306 and a display 308. The transceiver 302, the processor 304, the memory 306 and the display 308 may communicate with each other via bus 310. Examples of the bus 310 may include a data bus, an address bus, a serial bus and the like. It is noted that the communication device 300 may include fewer or more components and that the components of communication device 300 are depicted in FIG. 3 for illustrative purposes. In an embodiment, the various components of the communication device 300 such as the transceiver 302, the processor 304, the memory 306, the display 308 and the bus 310 may be implemented as hardware, software, firmware or any combination thereof. In an embodiment, the memory 306 is capable of storing machine executable instructions. Further, the processor 304 is capable of executing the stored machine executable instructions. In an embodiment, the processor 304 may be embodied as a multi-core processor, a single core processor, or a combination of one or more multi-core processors and one or more single core processors. For example, the processor 304 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 304 may be configured to execute hard-coded functionality. In an embodiment, the processor 304 is embodied as an executor of software instructions, wherein the instructions may specifically configure the processor 304 to perform the algorithms and/or operations described herein when the instructions are executed. The processor 304 may include, among other things, a clock, an arithmetic logic unit (ALU) and logic gates configured to support an operation of the processor 304. Examples of the memory 306 may include, but are not limited to, random access memory (RAM), dual port RAM, synchronous dynamic RAM (SDRAM), double data rate SDRAM (DDR SDRAM), and the like. In an embodiment, the transceiver 302 may include electrical circuitry, including radio/antenna circuitry, for facilitating communication (i.e. receiving and transmitting information) with remote entities, such as the system 200, communication devices associated with other remote users in the one or more online communities of remote users (such as the online community of remote users explained with reference to FIG. 2) and the like.

In an embodiment, the transceiver 302 is configured to communicate with a remote system (such as the system 200) to receive a spotting dictionary (such as the spotting dictionary explained with reference to FIG. 2). The spotting dictionary includes a listing of popular spots. As explained with reference to FIG. 2, a popular spot refers to a popular word or a popular phrase being shared in one or more online communities of remote users. In an embodiment, the memory 306 is configured to store the spotting dictionary. In an embodiment the processor 304 may be configured to integrate the spotting dictionary with one or more word dictionaries and facilitate provisioning of the popular spots as word completions, phrase completions, word suggestions, phrase suggestions and next word predictions during instances of user text entry. Further, as explained with reference to FIG. 2, spotting dictionary may include information related to the profile of the word like context, ontological inference, etymological inference, temporal information, spatial information, trend score and other such quantitative and qualitative data. In an embodiment, the information may be weighted appropriately by the processor 304 to determine the decide best set of words to display for word completions, phrase completions, word suggestions, phrase suggestions and next word predictions during instances of user text entry. As explained with reference to FIG. 2, the spotting dictionary is configured to be one of a language specific dictionary and a multi-lingual dictionary.

In an embodiment, the transceiver 302 is further configured to receive an interactive application capable of natively residing in the memory 306 from the system 200. The application includes a plurality of UIs configured to facilitate sharing of a word or a phrase by the device user associated with the communication device as a spot. An exemplary UI of the application upon being invoked from the memory 306 is depicted in FIG. 4.

Figure 4:
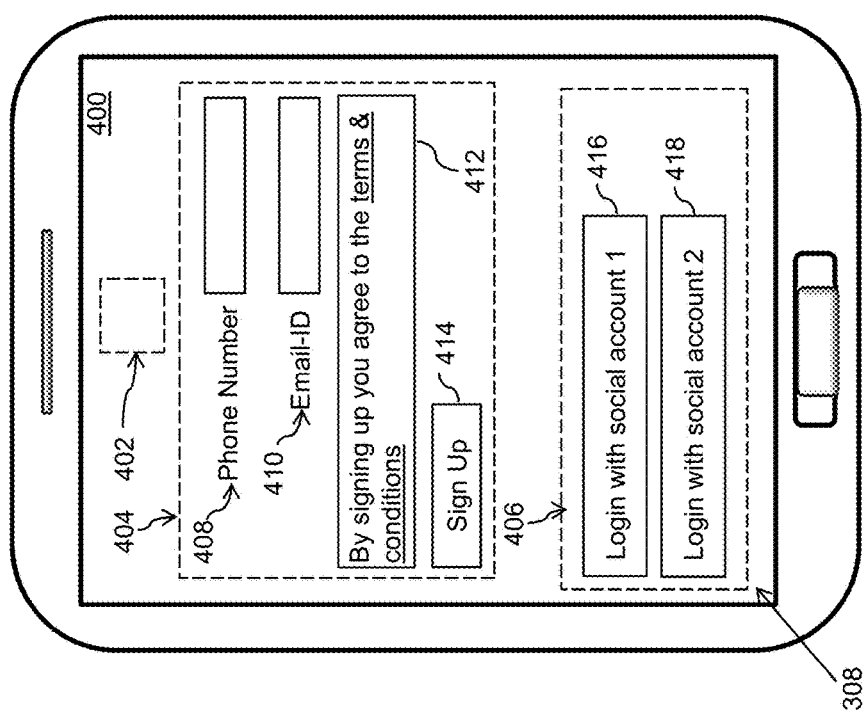
FIG. 4 illustrates an exemplary user sign up UI displayed to a user on the display of the communication device upon invoking an application in accordance with an embodiment.

Referring now to FIG. 4, an exemplary user sign-up UI 400 displayed to a user on the display 308 of the communication device 300 upon invoking the application is illustrated in accordance with an embodiment. It is noted that the communication device 300 is depicted to a mobile phone for exemplary purposes. It is noted that the communication device 300 may be any of a personal computer, laptop, a tablet device or any such electronic device. The user sign-up UI 400 (hereinafter referred to as UI 400) includes an application logo 402, which distinguishes the application from other applications in the communication device 300. The UI 400 further includes a first section 404 and a second section 406. The first section 404 is depicted to include web form fields for a phone number 408 and an email id 410. The user may provide the requisite information in the text entry fields associated with the web form fields using text entry means associated with the communication device 300, such as for example a physical or virtual keyboard, an auto-fill option and the like. A text-based intimation 412 is displayed below the web form fields in the first section 404 to inform the user that he/she agrees to the terms and conditions of user agreement if he/she chooses to sign in (or login) to the application. The text-based intimation 412 may include a hyperlink provisioning access to the end user agreement associated with application. The user may access the end user agreement and familiarize himself/herself with the terms therein prior to clicking on the "Sign Up" button 414 provided in the first section 404. The clicking on the Sign up button 414 may serve to provision user details, such as the phone number and the email id, to a remote system (such as system 200) for verification and provision subsequent access upon verification.

It is understood that the first section 404 is depicted to include two web form fields for the phone number 408 and the email id 410 for illustration purposes. The first section 404 may include more or fewer form fields requesting user personal details for application sign up purposes. For example, in some embodiments, the first section 404 may include a web form field for phone number 408 only. In some embodiments, the phone number 408 web form field requesting user phone number may be configured to automatically retrieve the requested information from the phone's subscriber identity mobile (SIM) card. In some embodiments, the user may be requested to manually key-in the requested information. In an embodiment, the text entry field associated with the phone number 408 web form field may request the user to include the country code information in the phone number 408 being entered. Alternatively, the user may be displayed a drop down menu of countries of the world and/or flag associated with various countries to choose the country/flag associated with the phone number 408. Upon receiving a user selection of country/flag, the country code may be automatically retrieved and included in the text entry field associated with the phone number 408 web form field. The user may then subsequently add the local number to the country code.

In an embodiment, the UI 400 is configured to provide the user with live inline alerts when he/she enters false/incorrect phone numbers and e-mail ids. In some embodiments, when the user initiates typing the phone number 408 or the e-mail id 410, he/she may be offered relevant autosuggestions for facilitating quick and accurate text entry into the text entry fields.

Alternatively, the user may preclude provisioning personal details requested in the first section 404, and may directly sign in into the application using login information associated with already existing user social accounts in the second section 406. The second section 406 is exemplarily depicted to provision two options of logging into the application using social account 1 (for example by clicking on the button 416) or using a social account 2 (for example, by clicking on the button 418). Examples of the user social accounts may include, but not limited to, Facebook™, Twitter™, LinkedIn™ and the like. When the user clicks on the button 416, a web form (not shown in FIG. 4) associated with the social account 1 is displayed to the user. The user may fill in entry fields associated with the web form corresponding to the social account 1 to sign up into the application. Alternatively, the user may click the button 418, which displays a web form (not shown in FIG. 4) associated with the second social account to the user. The user may fill in entry fields associated with the web form corresponding to the social account 2 to sign up into the application. Once the user signs up either by provisioning personal information into the text entry fields associated with the web form fields in the first section 404 or by using login information associated with existing user social accounts in the second section 406, a home page UI corresponding to the application is displayed to the user. It is noted that the home page UI may be provisioned to the user after sign up as well as subsequent logging into the application. A home page UI is further explained with reference to FIG. 5.

Figure 5:
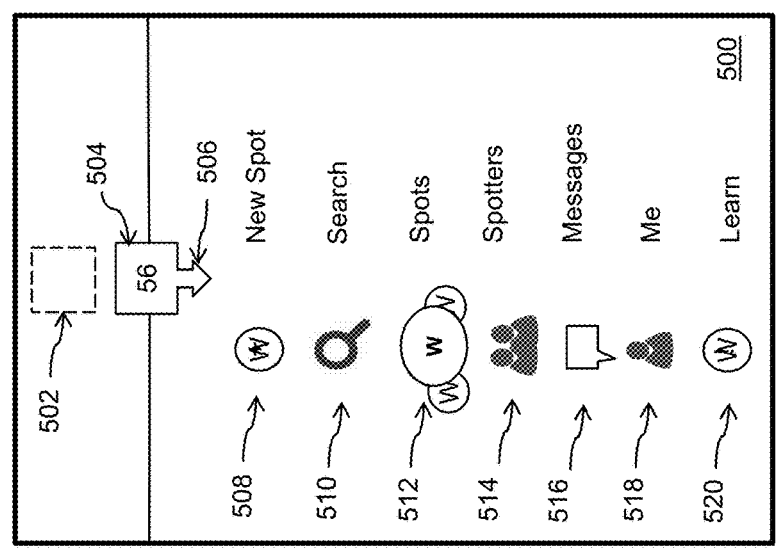
FIG. 5 illustrates an exemplary home page UI displayed to a user on the display of the communication device upon a user logging (or signing) into the application in accordance with an embodiment.

Referring now to FIG. 5, an exemplary home page UI 500 displayed to a user on the display 308 of the communication device 300 upon a user logging (or signing) into the application is illustrated in accordance with an embodiment. As explained with reference to FIG. 3, the display 308 may correspond to any communication device from among a mobile phone, a personal computer, laptop, a tablet device or any such electronic device. The home page UI 500 (hereinafter referred to as UI 500) includes an application logo 502, which may be similar to the application logo 402 explained in reference to FIG. 4. The UI 500 further depicts an alert notification icon 504. The alert notification icon 504 is configured to intimate a user of a number of new alert notifications since last user login to the application. For example, the alert notification icon 504 is depicted to display a numeral '56' indicating that 56 new alert notifications are pending user attention. It is noted that the numeral 56 is depicted in alert notification icon 504 for exemplary purposes only and that the alert notification icon 504 may include any number of alert notifications. In an embodiment, the alert notification icon 504 may be provisioned as a button, which may be tapped to view the notifications. In an embodiment, the alert notification icon 504 may be associated with a touch screen input, such as a sliding motion in a direction of a block arrow 506 associated with the alert notification icon 504 to view the alert notifications. In an embodiment, the alert notification icon 504 may be configured as a bell or an alarm clock for notifying the user about the alert notifications. It is understood that the alert notification icon 504 may be associated with any such configuration for facilitating viewing of the alert notifications. In an embodiment, the alert notifications may correspond to intimations corresponding to recently shared spot among the one or more online communities of remote users, a friend approval request from another remote user and a comment or a tag attributed to the spot shared by the remote user and the like. In an embodiment, when the user invokes the alert notification icon 504, an alert menu UI is displayed to the user. In the alert menu UI, the user may view all notifications associated with his/her user account. The alert notification UI is explained later with reference to FIGS. 9, 10 and 11.

In an embodiment, the UI 500 is further depicted to display a plurality of menu icons for facilitating the remote user to navigate through the application. In an embodiment, the plurality of menu icons are depicted to include a 'New Spot' icon 508, a 'Search' icon 510, a 'Spots' icon 512, a 'Spotters' icon 514, a 'Messages' icon 516, a 'Me' icon 518 and a 'Learn' icon 520. It is noted that the UI 500 is depicted to display menu icons 508-520 for illustration purposes and the UI 500 may include fewer or more icons for facilitating spotting of words and phrases. In an embodiment, each menu icon from among the plurality of menu icons is configured as a button, which the user may tap to open a UI associated with the respective menu icon.

In an embodiment, the 'New Spot' icon 508 is configured to facilitate the user in creating a new spot. When the user taps the 'New Spot' icon 508, a UI corresponding to the 'New Spot' icon 508 is displayed to the user on the display 308 of the communication device 300. The UI facilitates the user to add a word or phrase as a spot and further include information, such as where the word/phrase was spotted, a description of the spotted word/phrase, and an image/video corresponding to the spotted word/phrase and the like. The UI corresponding to the 'New Spot' icon 508 is explained in further detail with reference to FIG. 6.

In an embodiment, the 'Search' icon 510 is configured to facilitate the user to search from a list of available spots and spotters. It is noted that users associated with spotted words/phrases are referred to herein as spotters. When the user taps the 'Search' icon 510, a UI corresponding to the 'Search' icon 510 is displayed to the user on the display 308. Such a UI may include separate tabs for spots and spotters, which the user may access to perform his/her respective search. The UI corresponding to the 'Search' icon 510 is explained in further detail with reference to FIG. 14.

In an embodiment, the 'Spots' icon 512 is configured to provision a list of latest words or phrases identified as spots in addition to the information related to each of these spots. For example, when the user taps the 'Spots' icon 512, a UI associated with the spots icon is displayed to the user on the display 308. The UI corresponding to the 'Spots' icon 512 is explained in further detail with reference to FIG. 12.

In an embodiment, the 'Spotters' icon 514 is configured to facilitate the user to view the list of available spotters (for example, from among the one or more online communities of remote users) and the information related to the spotters. When the user taps the 'Spotters' icon 514, a UI associated with the 'Spotters' icon 514 is displayed to the user on the display 308. The UI corresponding to the 'Spotters' icon 514 is explained in further detail with reference to FIG. 13.

In an embodiment, the 'Messages' icon 516 is configured to facilitate the user to view or send messages to one or more spotters, for example, from among the one or more online communities of remote users. When the user taps the 'Messages' icon 516, a UI associated with the 'Messages' icon 516 is displayed to the user on the display 308. The UI may include a list of spotters and the user may tap his/her desired spotter, which opens another UI displaying a thread comprising a set of messages associated with that spotter. In an embodiment, the unread messages may be displayed as a snippet and/or bolded text along with the name of the spotter.

In an embodiment, the 'Me' icon 518 is configured to enable the user to view his/her profile information. When the remote user taps the 'Me' icon 518, an UI associated with the 'Me' icon 518 is displayed to the user in the display 308. The UI is configured to display a user profile information along with links to user's accounts on social networking sites, such as Facebook™, Twitter™ and the like. The UI also may include options for editing user profile. In an embodiment, the 'Learn' icon 520 is configured to provision a UI including information about the various features associated with the application. The user may consult the content included therein to learn about the various options for spotting of words and phrases facilitated by the application. A UI configured to enable the remote user to provision a word or a phrase of user interest for its subsequent selection as the spot is explained with reference to FIG. 6.

Figure 6:
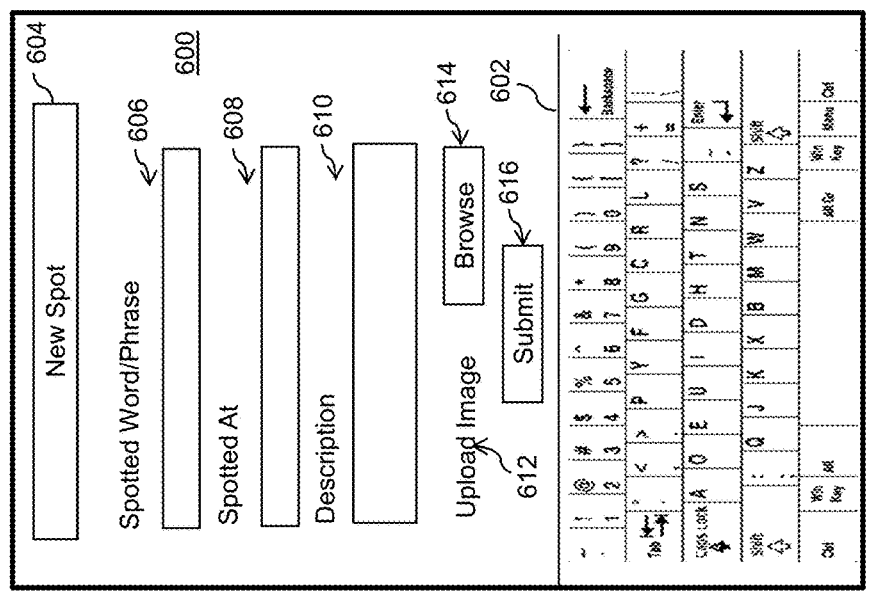
FIG. 6 illustrates an exemplary UI from among the plurality of UIs associated with the application for facilitating creation of a spot in accordance with an embodiment.

Referring now to FIG. 6, an exemplary UI 600 from among the plurality of UIs associated with the application for facilitating creation of a spot is illustrated in accordance with an embodiment. As explained with reference to FIG. 5, the UI 500 includes the 'New spot' icon 508, which when accessed or invoked provisions a UI, such as the UI 600, on the display 308 of the communication device 300. The UI 600 is also depicted to display a virtual keyboard 602 for enabling a user to provide textual input into the various form fields displayed on the UI 600. It is noted that the virtual keyboard 602 is depicted herein for illustration purposes and that possible alternatives, such as physical keyboards, such as QWERTY keyboard, associated with the communication device 300 may also be provisioned instead.

In an example scenario, a user upon coming across an interesting word or a phrase on online sources (such as textual content from a website, email and the like) or offline sources (such as newspapers, advertisement hoardings, street signboards, image files, video files and the like) may wish to share the interesting word or phrase with other users in the online community of remote users associated with the user. Accordingly, the user may invoke the application in the communication device 300 and may navigate to the UI 600. The UI 600 includes a title banner 'New Spot' 604 indicating a function of the UI being currently viewed by the user as one for creating new spots. The UI 600 further depicts web form fields titled 'Spotted Word/Phrase', 'Spotted At' and 'Description' associated with text boxes 606, 608 and 610, respectively. The user may key-in (or type) the interesting word or phrase in the text box 606, record the source of the interesting word/phrase in the text box 608 and define a snippet outlining a context of the spot in the text box 610. The UI 600 further depicts an icon 'Upload Image' 612 for enabling the user to upload an image related to the interesting word/or phrase. The user may also use the 'browse' button 614 to retrieve the image from the memory 306 of the communication device 300. It is noted that in some embodiments, the UI 600 may also include provisions for uploading video content as opposed to or in addition to uploading images. Upon completion of information provision, the user may select the 'Submit' button 616 to facilitate sharing of the word/phrase as a spot with other users. The creation of a new spot using the UI 600 is further explained with reference to an illustrative example as follows: The user may observe the word 'Screenager' on a billboard in suburb in New Jersey while driving a vehicle. The user may navigate to UI 600 as explained above and may input the word in the text box 606. Further, the user may record the name of the suburb in New Jersey in the text box 608 and write a note including a meaning of the word 'Screenager' (for example: "A person in their teens or twenties who has an aptitude for computers and the Internet") and/or an example usage of the word (for example: "We hear that school and public libraries have to increasingly meet the needs of screenagers") in the text box 610. The user may also click an image of the billboard and upload the image using the 'Upload image' icon 612. In an embodiment, the location of the signboard may be automatically determined using location determination technology, such as Global Positioning System (GPS) and the information may further append the information provided in the text box 608.

In another illustrative example, the user may coin a phrase 'I have been Bangalored' implying that my office has been relocated to Bangalore, India. The user may provide the textual input 'I have been Bangalored' in text box 606, may leave the text box 608 blank, include a meaning of the phrase in the text box 610 and select the 'Submit' button 616 for sharing the phrase as the spot. As explained above, the words or phrases shared as spots may be identified by the scanning module 202 of the system 200 and may be utilized to configure the spotting dictionary as explained with reference to FIG. 2. In another embodiment, a user may be directed to the UI 600 from a content source to facilitate spotting of interesting words/phrases from content sources as explained with reference to FIG. 7.

Figure 7:
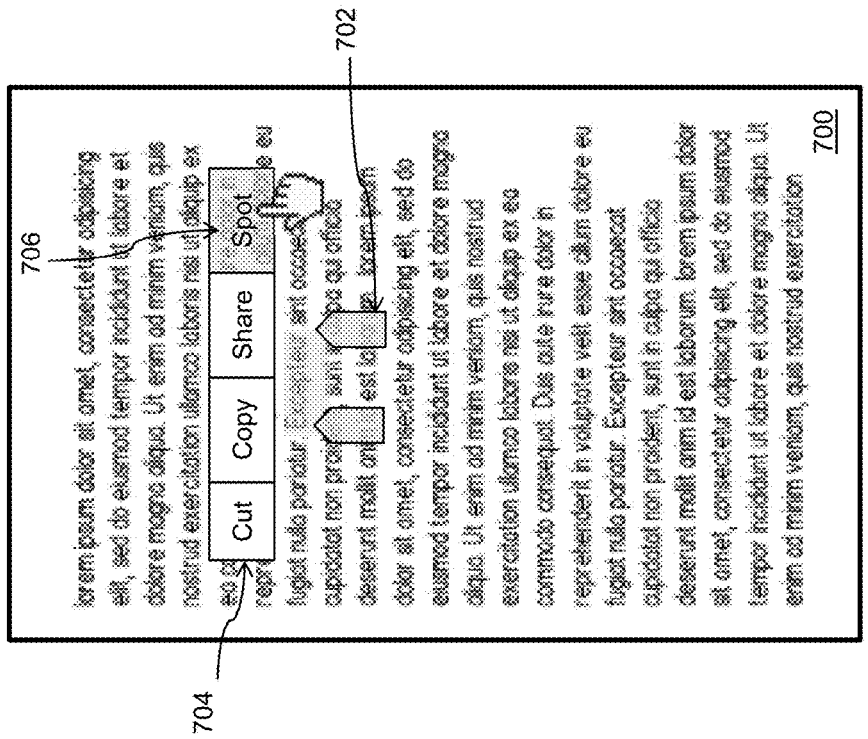
FIG. 7 illustrates an exemplary UI corresponding to the application configured to facilitate selection of a word/phrase as a spot in accordance with an embodiment.

FIG. 7 illustrates an exemplary UI 700 corresponding to the application configured to facilitate selection of a word/phrase as a spot in accordance with an embodiment. As explained above, the user may spot interesting words/phrases while reading/browsing through textual content, such as articles, news reports, message like emails or SMS, and the like displayed on the display 308. A user may highlight a portion (for example, an interesting word or an interesting phrase) of text corresponding to one of an online textual content source and an offline textual content source (hereinafter collectively referred to as textual content source. In an embodiment, the application is configured to provision an option within a set of clipboard options associated with a highlighted portion of text corresponding to the textual content source to enable a selection of the highlighted portion of the text as the spot. More specifically, the application is configured to facilitate the sharing of the word or the phrase as the spot by provisioning a clipboard option 'spot' from among one or more other clipboard options, such as 'cut' 'copy', 'paste' and enable choosing an highlight a portion of text as a spot. For example, in FIG. 7, a text-based document is displayed. The user may highlight a portion 702 of the text-based document (for example, the word 'Excepteur' is depicted to be selected in UI 700) and then invoke a clipboard option 704, for example, by right-clicking the mouse or using menu options. The clipboard option may include an option 'spot' 706 from among one or more other options in the clipboard option 704, such as 'cut' 'copy' and 'paste'. Upon selection of the option 'spot' 706, the user may be directed to the UI 600 for selecting the highlighted word or phrase as the spot as described above. In an embodiment, the user may be directed to a UI corresponding to alert notifications instead, where the spotted word on the content source is stored as a potential candidate for spotting. The user may navigate to such an UI to initiate spotting of the word/phrase. In yet another embodiment, the words/phrases may be selected as spots by appending the words/phrases with a pre-defined character during text entry. The creation of spots using the pre-defined character is facilitated by linking the application to user accounts on social networking websites as explained with reference to FIG. 8.

Figure 8:
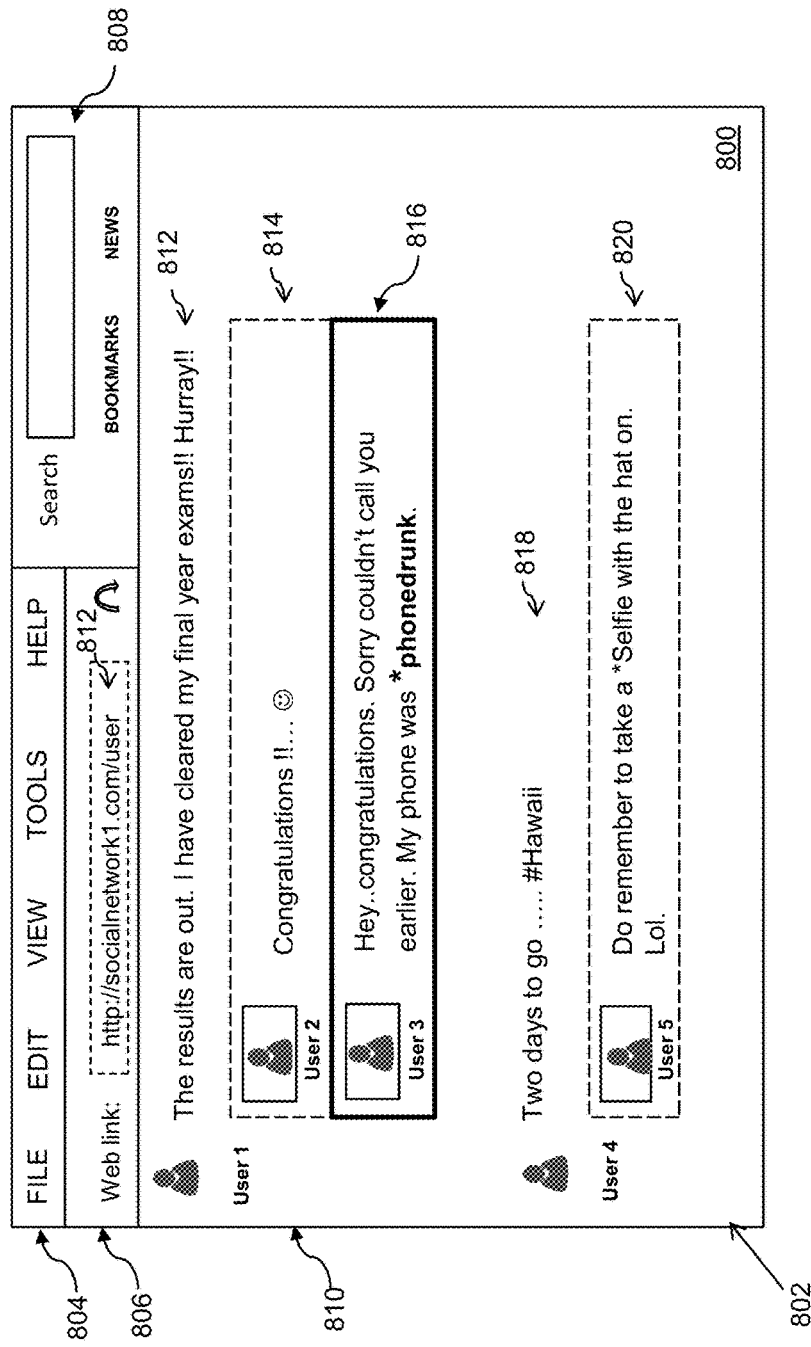
FIG. 8 illustrates an exemplary UI associated with a web browser depicting user account on a social networking website linked to the application for facilitating selection of a word/phrase as a spot in accordance with an embodiment.

FIG. 8 illustrates an exemplary UI 800 associated with a web browser 802 depicting user account on a social networking website linked to the application for facilitating selection of a word/phrase as a spot in accordance with an embodiment. The exemplary UI 800 associated with the web browser 802 may be displayed on the display 308 of the communication device 300. More specifically, the user may maintain a plurality of user accounts corresponding to one or more social networking websites like Facebook™, Twitter™, Linkedin™ and the like. The user may access the social networking websites using their respective web uniform resource locators (URLs) on a web browser, such as the web browser 802. A user may invoke the web browser 802 associated with the communication device 300 and retrieve the user account of the desired social networking site. In an embodiment, the application may be configured to be linked to one or more user accounts on social networking sites (also referred herein as user social accounts or user accounts). The spotting of words and phrases on linked user accounts is explained below with help of an illustrative example and UI 800.

The web browser 802 is depicted to include a first menu section 804, a web uniform resource locator (URL) section 806, a second menu section 808 and a UI display section 810. The first menu section 804 includes menu options such as "File", "Edit", "View", "Tools" and "Help". It is noted that the menu options in the first menu section 804 are depicted for exemplary purposes and that the first menu section 804 may include fewer or more number of menu options than those displayed in the FIG. 8. Further, each menu option of the first menu section 804 may be configured to display upon clicking, a drop down list of secondary menu options. For example, upon clicking on the "File" menu option, a drop down list of secondary menu options such as "New Window", "New Tab", "Open location", "Save As" and the like may be displayed. Each of the secondary menu options may be associated with an intended functionality. For example, the "New Window" secondary menu option may facilitate an opening of a new browser window. Similarly, the "Save As" secondary menu option may facilitate saving of the UI on display in one of various formats, such as for example a hyper text mark-up language (HTML) format or a text format. Each of the menu options such as "Edit", "View", "Tools" and "Help" may similarly include secondary menu options with associated functionalities.

The web URL section 806 is depicted to include a text box configured to receive user input in form of a web link, such as web link 812 (depicted as "http://socialnetwork1.com/user"). The web link 812 is configured to trigger a hypertext transfer protocol (HTTP) request to fetch a desired UI, such as UI 800, corresponding to the user account on a social networking website 'socialnetworking1.com' from over a network, such as the network 142 explained with reference to FIG. 1. It is noted that the fetching of the webpage corresponding to the UI 800 may involve standard procedures such as domain name resolutions using a domain name server (DNS) server and the like and are not discussed herein. The web URL section 806 may further include a refresh icon for re-sending the HTTP request for re-fetching the UI 800.

The second menu section 808 is depicted to include a text box configured to receive user input in form of a search request. In an embodiment, the text box for search request may be associated with one or more search engines, such as Google search engine, Yahoo search engine, Baidu search engine and the like. Upon receiving user input in form of text for searching on the Internet, an UI including results of the search may be displayed to the remote user. The second menu option 808 is further depicted to include tabs for "bookmarks" and "news". In an example embodiment, a tab for "bookmarks" may be configured to store and/or list user-selected UIs (or web pages) as bookmarks for facilitating an ease of future access. In an example embodiment, the "news" tab may be configured to facilitate access to UIs corresponding to news related web-based applications.

The UI display section 810 is depicted to display the UI 800 corresponding to the web link 812. In an embodiment, the web link 812 may correspond to a user account of a social networking site linked to the application. In an embodiment, the user may login into the application through the social networking account credentials (as explained with reference to FIG. 4) and thereby link the application to the user account on the social networking website. In an embodiment, the user may be provisioned a separate UI (not described herein) for linking the application to one or more user accounts on various social networking websites. In an embodiment, the application is configured to prompt the user, during text entry on the one or more user accounts on social networking websites, to append the word or the phase with at least one pre-defined character to indicate a selection of the word or the phrase as the spot. The application is further configured to extract words or phrases appended with at least one pre-defined character within online textual content corresponding to the one or more user accounts on social networking websites and provision the extracted words and phrases as candidates for subsequent selection of the words or the phrases as spots. In the illustrative example of the UI 800, the pre-defined character is depicted to be an asterisk sign (*). Accordingly, a word such as *selfie may indicate the word 'selfie' as a spot by the user. The user may be prompted to append the asterisk sign while typing selfie, or, the user may on his own append the asterisk sign to the word to indicate its selection as the spot. The word or a phrase indicated to be a spot in such a manner may be retrieved, either dynamically or at pre-defined intervals and included among the spots spotted by the user. The appending of the word or phrase with the pre-defined character is further explained with the help of a conversational thread on the linked user account.

The UI display section 810 depicts exemplary conversation threads associated with the user account. A 'user 1' is depicted to have posted an update 812 including the following text "The results are out, I have cleared my final year exams!! Hurray!!". Another user, user 2, has replied to the status update 812 with a comment 814 including the text "Congratulations". A text box 816 is provisioned to the user of communication device 300 to comment on the post. The user has typed the following textual content: "Hey . . . Congratulations. Sorry couldn't call you earlier. My phone was *phonedrunk". The user may append the character '*' before the word 'phonedrunk' to signify its selection as a spot. The application may be configured to retrieve such words from the linked user accounts and display them in a UI corresponding to alert notifications (explained later with reference to FIG. 9) for facilitating spotting of such words. The UI 800 is further depicted to include another conversation thread between user 4 and user 5. The user 4 is depicted to have posted an update 818 including the following textual content: "Two days to go . . . #Hawaii". The user 5 has replied to the update 818 with the comment 820 with the following textual content: "Do remember to take a *Selfie with the hat on. Lol". As the word 'Selfie' is appended by the character '*' signifying a spot by user 5, it may be selected to be included in the UI corresponding to alert notifications by the application in his/her communication device. As explained earlier, the scanning module 202 of the system 200 may scan a plurality of content sources, including user accounts of social networking sites for the plurality of remote users to extract words or phrases disposed substantially adjacent to pre-defined characters as spots. A popularity of such spots may be computed and their inclusion in the spotting dictionary determined based on their popularity as explained with reference to FIG. 2.

In an embodiment, the user may append a pre-defined character at a beginning of a set of words and at an end of the set of words to signify the spotting of a phrase composed of the set of words included between the two pre-defined characters. For example, appending the pre-defined character at the beginning and at the end of the set of words 'I have been Bangalored' as follows: *I have been Bangalored* may signify the spotting of a phrase 'I have been Bangalored'. In an embodiment, the respotting of a word may be signified by appending two pre-defined characters disposed adjacent to the word. For example, the word 'Excepteur' may be respotted by appending two pre-defined characters in front of the word as follows: **Excepteur. As explained herein, words or phrases may be spotted/respotted by appending the word or the phrase with the at least one pre-defined character to indicate the selection of the word or the phrase as the spot. It is noted that the pre-defined character * is included herein for illustration purposes. It is understood that any such character, such as hashtag (#) or any symbol may be used, and the embodiments disclosed herein may not be limited to asterisk (*). Further, the pre-defined character may be appended at a variety of positions, such as at the beginning, at the end, as a subscript, as a superscript etc. to signify the word disposed at an adjacent location as the spot.

In an embodiment, the application is configured to monitor the content being typed by the user on a linked user account an on-going basis and prompt the user to append the word or the phase with at least one pre-defined character to indicate a selection of the word or the phrase as the spot. Thereafter, the application may be configured to enable the user to append the word or the phrase with the at least one pre-defined character to indicate the selection of the word or the phrase as the spot.

As explained above, the application is configured to retrieve all the words and phrases disposed adjacent to the pre-defined character in the user linked account and include the retrieved words/phrases in an alert notifications UI of the application. A user may invoke the UI corresponding to the alert notifications and view a listing of such retrieved words and phrases. The user may proceed to share all or at least some of these words/phrases as spots with the plurality of remote users in one or more online communities of remote users. The UI corresponding to the alert notifications of the application is further explained with reference to FIG. 9.

Figure 9:
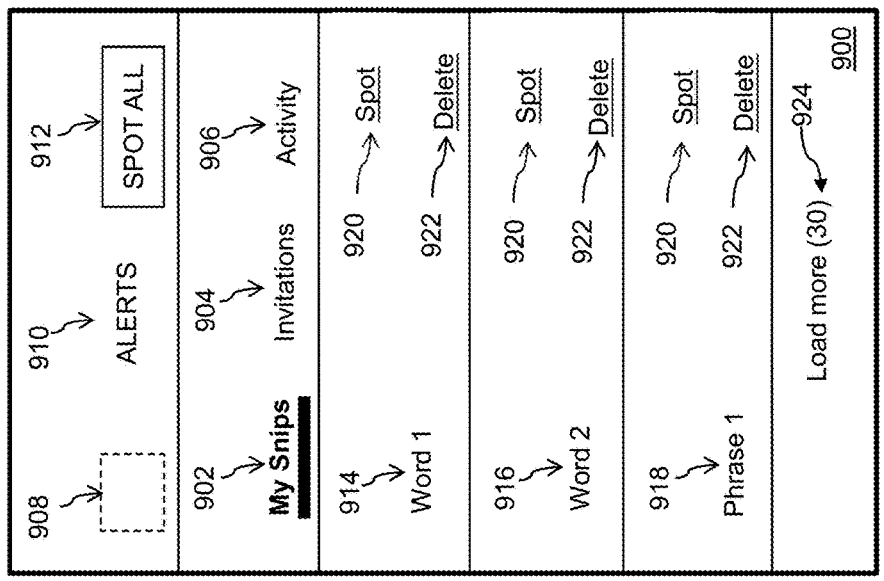
FIG. 9 illustrates an alert notification UI corresponding to the application for facilitating spotting of words and phrases in accordance with an embodiment.

FIG. 9 illustrates an alert notification UI 900 corresponding to the application for facilitating spotting of words and phrases in accordance with an embodiment. The alert notification UI 900 (hereinafter referred to as UI 900) corresponding to the application displayed on the display 308 of the communication device 300 is depicted to include tabs, such as 'My Snips' tab 902, 'Invitations' tab 904 and an 'Activity' tab 906. Additionally, the UI 900 is depicted to display an application logo 908, a UI title banner 910 and an icon 'SPOT ALL' 912. The application logo 902 may be similar to the logo 402 explained with reference to FIG. 4 and is not explained herein for sake of brevity. The UI 900 may be invoked by accessing 'alert notification icon 504' on the homepage UI 500 explained with reference to FIG. 5.

As explained above with reference to FIG. 8, words and phrases disposed adjacent to the pre-defined characters in the user linked account are included in the UI corresponding to the alert notifications. The words/phrases retrieved from the user linked account are depicted to be listed under the 'My Snips' tab 902, such as 'Word 1' 914, 'Word 2' 916 and 'Phrase 1' 918. Each of these retrieved word/phrase is associated with icons 'Spot' 920 and 'Delete' 922. The user may choose to individually share the word or phrase using the icon 'Spot' 920 or choose to share all the words/phrases using the icon 'SPOT ALL' 912. Alternatively, the user may also choose to preclude sharing of one or more words/phrases as spot by using the icon 'Delete' 922.

The UI 900 further includes button 'load more' 924, which is configured to load more retrieved words/phrases in the UI 900. The button 'load more' 924 is further associated with a numeral (depicted to be '30' in FIG. 9), which is configured to indicate a number of words/phrases that may be loaded upon clicking or tapping on the button 'load more' 924. The UIs corresponding to the 'Invitations' tab 904 and the 'activity' tab 906 are explained with reference to FIGS. 10 and 11, respectively.

Figure 10:
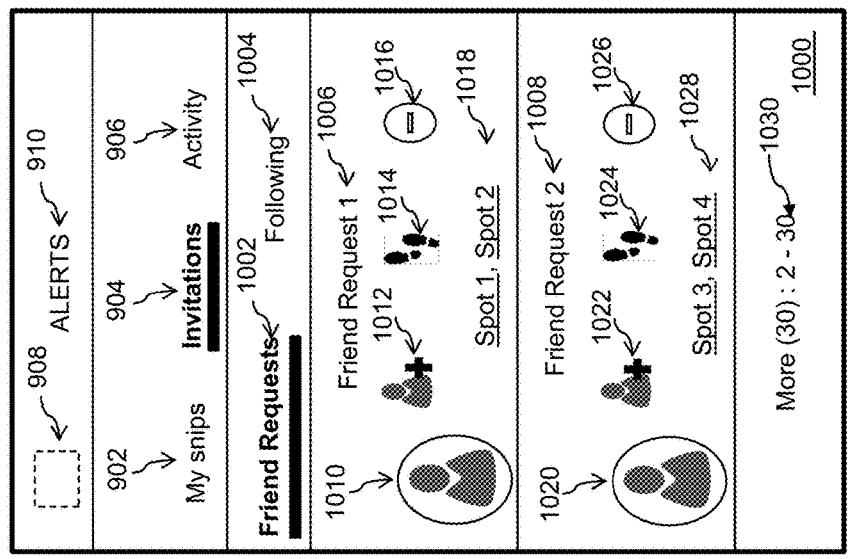
FIG. 10 illustrates a UI corresponding to the 'Invitations' tab from among a plurality of tabs in the alert notification UI associated with the application in accordance with an embodiment.

FIG. 10 illustrates a UI 1000 corresponding to the 'Invitations' tab 904 from among a plurality of tabs in the alert notification UI 900 associated with the application in accordance with an embodiment. The UI 1000 may be displayed on the display 308 of the communication device 300 upon invoking the 'Invitations' tab 904 on the UI 900 explained with reference to FIG. 9. The UI 1000 also depicts 'My Snips' tab 902, the Activity tab 906, the application logo 908 and the UI title banner 910, which are already discussed with reference to FIG. 9 and are not described herein. The UI 1000 corresponding to the 'Invitations' tab 904 depicts two tabs: a 'Friend Request' tab 1002 and a 'Following' tab 1004. In FIG. 10, the UI 1000 is depicted to correspond to the 'Friend Request' tab 1002 by default, however such an illustration may not be considered to be limiting. The 'Friend Request' tab 1002 is depicted to display one or more friend approval request, such as 'friend request 1' 1006 (hereinafter referred to as friend request) and 'friend request 2' 1008 (hereinafter referred to as $2^{nd}$ friend request). The $1^{st}$ friend request is depicted to display an image thumbnail 1010 associated with the $1^{st}$ friend to be approved. Three icons 1012, 1014 and 1016 are depicted to be provisioned adjacent to the image thumbnail 1010 and are configured to facilitate an approving of the $1^{st}$ friend request, provision a list of users following a spotting activity of the $1^{st}$ friend and ignore the $1^{st}$ friend, respectively. Additionally, a spotting activity bar 1018 including latest words/phrases spotted by the $1^{st}$ friend, such as spot 1 and spot 2, are depicted to assist the user in making a decision regarding approving the $1^{st}$ friend request. The $2^{nd}$ friend request similarly depicts an image thumbnail 1020 associated with three icons 1022, 1024 and 1026 configured to facilitate an approving of the $2^{nd}$ friend request, provision a list of users following a spotting activity of the $2^{nd}$ friend and ignore the $2^{nd}$ friend, respectively. Further, a spotting activity bar 1028 including latest words/phrases spotted by the 2$^{nd}$ friend, such as spot 3 and spot 4, are depicted to assist the user in making a decision regarding approving the 2$^{nd}$ friend request.

The UI 1000 further includes button 'More' 1030, which is configured to load more friend requests in the UI 1000. The button 'More' 1030 is further associated with a numeral (depicted to be '2-30' in FIG. 10), which is configured to indicate a number of friend requests (for example, two) out of a total number of pending friend requests (for example, 30) currently being displayed on the UI 1000 and those that may be loaded upon clicking or tapping on the button 'More' 1030.

The 'Following' tab 1004 is configured to provision a list of users following a spotting activity of the user of the communication device 300. The UI corresponding to the 'Activity' tab 906 is explained with reference to FIG. 11.

Figure 11:
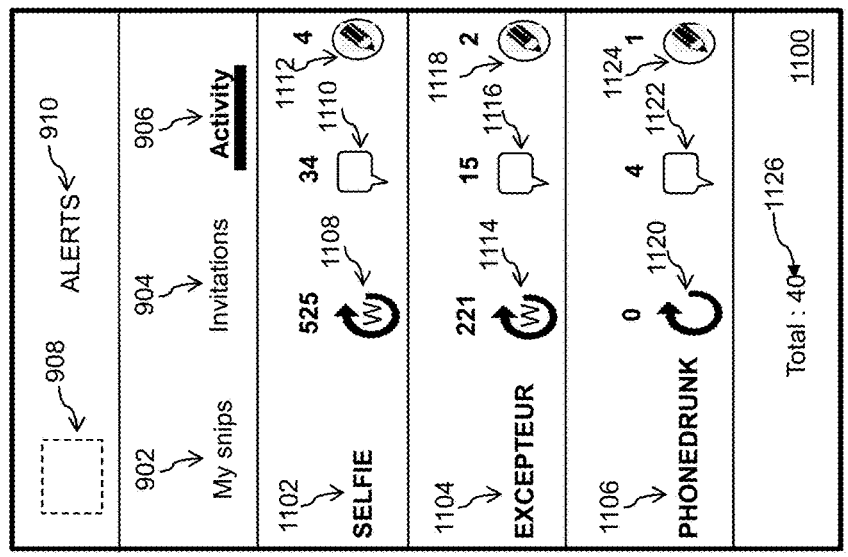
FIG. 11 illustrates a UI corresponding to the 'Activity' tab from among a plurality of tabs in the alert notification UI associated with the application in accordance with an embodiment.

Referring now to FIG. 11, a UI 1100 corresponding to the 'Activity' tab 906 from among a plurality of tabs in the alert notification UI 900 associated with the application is illustrated in accordance with an embodiment. The UI 1100 may be displayed on the display 308 of the communication device 300 upon invoking the 'Activity' tab 906 on the UI 900 explained with reference to FIG. 9. The UI 1100 also depicts 'My snips' tab 902, the 'Invitations' tab 904, the application logo 908 and the UI title banner 910, which are already discussed with reference to FIGS. 9 and 10 and are not described herein. The 'Activity' tab 906 is depicted to display a spotting activity in terms of one or more spots along with associated information being shared by others users within the user's online community of remote users. For example, the UI 1100 depicts spots 'SELFIE' 1102, 'EXCEPTEUR' 1104 and 'PHONEDRUNK' 1106 as three spots being shared among the online communities of remote users associated with the user. Each spot is associated with three icons configured to indicate a number of times a spot was respotted (or re-shared), a number of comments associated with the spot and a number of notes associated with the spot. For example, spot 'SELFIE' 1102 is depicted to be associated with icons 1108, 1110 and 1112 indicating that the spot 'SELFIE' 1102 was re-spotted 525 times, a number of comments associated with the spot 'SELFIE' 1102 is 34 and there are four notes associated with spot 'SELFIE' 1102 in the one or more online communities of remote users, respectively. Similarly, the spot 'EXCEPTEUR' 1104 is depicted to be associated with icons 1114, 1116 and 1118 indicating that the spot 'EXCEPTEUR' 1104 was re-spotted 221 times, a number of comments associated with the spot 'EXCEPTEUR' 1104 is 15 and there are two notes associated with the spot 'EXCEPTEUR' 1104 in the one or more online communities of remote users, respectively. Furthermore, the spot 'PHONEDRUNK' 1106 is depicted to be associated with icons 1120, 1122 and 1124 indicating that the spot 'PHONEDRUNK' 1106 was re-spotted zero times, a number of comments associated with the spot 'PHONEDRUNK' 1106 is four and there is one note associated with the spot 'PHONEDRUNK' 1106 in the one or more online communities of remote users, respectively.

The UI 1100 further includes button 'Total' 1126 associated with a numeral (depicted to be '40' in FIG. 11), which is configured to indicate a total number of words/phrases currently being shared in the one or more online communities of remote users. The remaining spots may be invoked by clicking or tapping on the button 'Total' 1126.

As explained above, the various UIs such as the UI 900, UI 1000 and UI 1100 may be accessed by the user by invoking the alert notification icon '504' in the home page UI 500 explained with reference to FIG. 5. The UI provisioned upon invoking the 'Spots' icon 512 on the home page UI 500 is explained with reference to FIG. 12.

Figure 12:
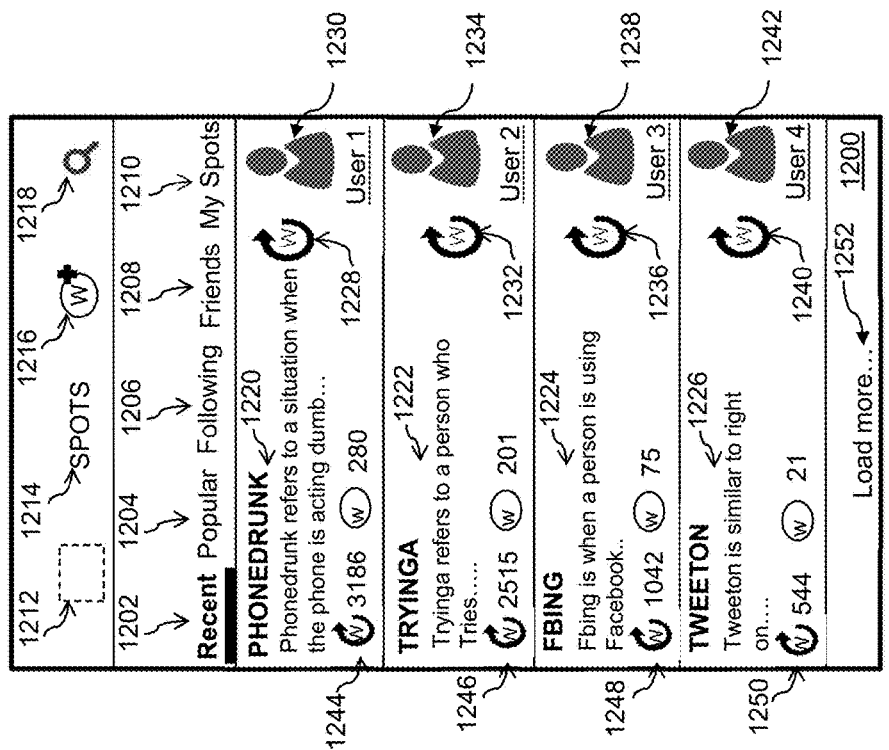
FIG. 12 illustrates a UI provisioned upon invoking the 'Spots' icon on the home page UI in accordance with an embodiment.

FIG. 12 illustrates a UI 1200 provisioned upon invoking the 'Spots' icon 512 on the home page UI 500 (explained with reference to FIG. 5), in accordance with an embodiment. The UI 1200 corresponding to the 'Spots' icon 512 is provisioned to the user on the display 308 of the communication device 300. The UI 1200 corresponding to the 'Spots' icon 512 is depicted to include tabs, such as a 'Recent' tab 1202, a 'Popular' tab 1204, a 'Following' tab 1206, a 'Friends' tab 1208, and a 'My Spots' tab 1210. Additionally, the UI 1200 is depicted to display an application logo 1212, a UI title banner 'SPOTS' 1214, a new spot icon 1216 and a search icon 1218. The application logo 1212 is configured to uniquely distinguish the application from among other applications in the user communication device 300, as explained above. The new spot icon 1216 when invoked may provision the UI 600, which is configured to enable the user to provision words and phrases of user interest for their subsequent selection as the spots, as explained with reference to FIG. 6. The search icon 1218 may be configured to receive textual input for retrieving search results corresponding to spots and/or spotters as will be explained later with reference to the FIG. 14.

In an embodiment, the 'Recent' tab 1202 is configured to display a list of spots that were recently spotted and shared among the online community of remote users. The list of spots under the 'Recent' tab 1202 is depicted to display spots, such as PHONEDRUNK' 1220, 'TRYINGA' 1222, 'FBING' 1224 and 'TWEETON' 1226. Each of these spots is associated with a preview of a textual description outlining a meaning of the respective spots. For example, the spot 'PHONEDRUNK' 1220 is associated with the following description: Phonedrunk refers to a situation when the phone is acting dumb'. The spot 'TRYINGA' 1222 is associated with the following description: 'Tryinga refers to a person who is a trier'. The spot 'FBING' is associated with following description: Fbing refers to person currently active on Facebook. The spot 'TWEETON' 1226 is associated with following description: 'Tweeton is similar to right on'. In an embodiment, upon tapping or clicking on the description, a UI displaying a detailed meaning and an exemplary usage of the spot may be provisioned to the user.

Further, each of the spots is associated with a 'respot' icon and an image thumbnail. The 'respot' icon is configured to facilitate respotting or resharing of the associated spot. The image thumbnail corresponds to the remote user (i.e. spotter) who has recently shared the spot. For example, the spot 'PHONEDRUNK' 1220 is associated with 'respot' icon 1228 and an image thumbnail 1230 of user 1 exemplarily depicted to be associated with the spot 'PHONEDRUNK' 1220. The spot 'TRYINGA' 1222 is associated with 'respot' icon 1232 and an image thumbnail 1234 of user 2 exemplarily depicted to be associated with the spot 'TRYINGA' 1222. The spot 'FBING' 1224 is associated with 'respot' icon 1236, and an image thumbnail 1238 of user 3 exemplarily depicted to be associated with the spot 'FBING' 1224. The spot 'TWEETON' 1226 is associated with 'respot' icon 1240 and an image thumbnail 1242 of user 4 exemplarily depicted to be associated with the spot 'TWEETON' 1226.

Furthermore, each spot is depicted to be associated with count information indicating a total number of respots and a total number of related spots associated with the spot. In an embodiment, the related spots may refer to those spots, which may be contextually related to each other. For example, the spot 'TWEETING' may be related to 'FBING'.

As displayed in the UI 1200, the spot PHONEDRUNK' 1220 is associated with count information 1244 depicting the total number of respots and the total number of related spots to be 3186 and 280, respectively. The spot 'TRYINGA' 1222 is associated with count information 1246 depicting the total number of respots and the total number of related spots to be 2515 and 201, respectively. The spot 'FBING' 1224 is associated with count information 1248 depicting the total number of respots and the total number of related spots to be 1042 and 75, respectively. The spot 'TWEETON' 1226 is associated with count information 1250 depicting the total number of respots and the total number of related spots to be 544 and 21, respectively.

In an embodiment, when the user taps on any spot from among the list of spots, a UI associated with spot profile is provisioned to the user on the display 308 of the device 300. The spot profile is explained later with reference to FIG. 15. The UI 1200 further includes button load More' 1252, which is configured to load more recent spots in the UI 1200 than those already displayed in the UI 1200.

In an embodiment, the 'Popular' tab 1204 may be configured to display a list of spots that are tagged as popular based on at least one popularity-based metric; the 'Following' tab 1206 may be configured to display a list of spots, whose spotting activity is being followed by the user; the 'Friends' tab 1208 may be configured to display a list of spots that are associated with friends of the user, and the 'My spots' tab 1210 may be configured to display a list of spots that are spotted/respotted by the user himself/herself. The user may tap or click on any of these desired tabs from among the plurality of tabs to view the list of spots associated with each tab. In some embodiments, the icons, such as the respot icon and the image thumbnail along with the count information may be provisioned with each spot from among the list of spots associated with each of these tabs. It is noted that in some embodiments, the UI 1200 associated with the 'Spots' icon 512 may be associated with standard navigation options, such as horizontal swipes to navigate through the tabs and/or vertical swipes to load subsequent/previous available spots. The UI provisioned upon invoking the 'Spotters' icon 514 on the home page UI 500 of FIG. 5 is explained with reference to FIG. 13.

Figure 13:
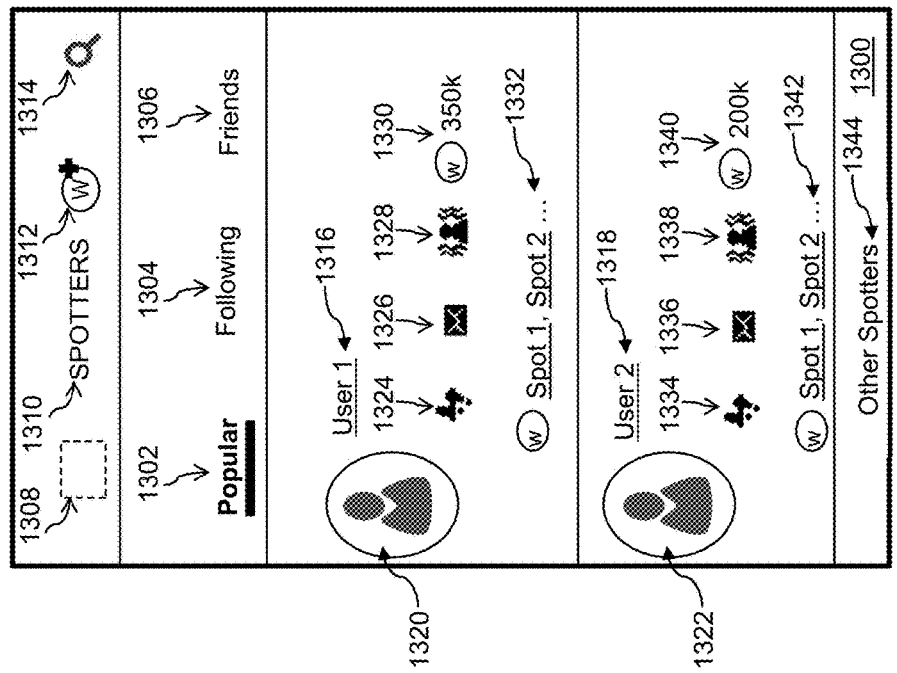
FIG. 13 illustrates a UI provisioned upon invoking the 'Spotters' icon on the home page UI in accordance with an embodiment.

FIG. 13 illustrates a UI 1300 provisioned upon invoking the 'Spotters' icon 514 on the home page UI 500 (explained with reference to FIG. 5), in accordance with an embodiment. The UI 1300 corresponding to the 'Spotters' icon 514 is provisioned to the user on the display 308 of the communication device 300. The UI 1300 corresponding to the 'Spotters' icon 514 is depicted to include tabs, such as a 'Popular' tab 1302, a 'Following' tab 1304, and a Friends tab 1306. Additionally, the UI 1300 is depicted to display an application logo 1308, a UI title banner 'SPOTTERS' 1310, a new spot icon 1312 and a search icon 1314. The application logo 1308 is configured to uniquely distinguish the application from among other applications in the user communication device 300, as explained above. The new spot icon 1312 when invoked may provision the UI 600, which is configured to enable the user to provision words and phrases of user interest for their subsequent selection as the spots, as explained with reference to FIG. 6. The search icon 1314 may be configured to receive textual input for retrieving search results corresponding to spots and/or spotters as will be explained later with reference to the FIG. 14.

In an embodiment, the 'Popular' tab 1302 may include a list of spotters that are tagged as popular based on at least one popularity-based metric as explained with reference to FIG. 2. The list of spotters under the 'Popular' tab 1302 is depicted to display spotters, such as 'User 1' 1316, and 'User 2' 1318. Each of the spotters is associated with an image thumbnail, which corresponds to the remote user (i.e. spotter). For example, the spotter 'User 1' 1316 is associated with an image thumbnail 1320 exemplarily depicted to be associated with the spotter 'User 1' 1316. The spotter 'User 2' 1318 is associated with an image thumbnail 1322 exemplarily depicted to be associated with the spotter 'User 1' 1318. Further, each spotter is depicted to be associated with icons, such as an 'Unfollow' icon, a 'Message' icon, a 'Plop' icon, a 'Spots' icon and a count information depicting a total number of spots. As displayed in the UI 1300, the spotter 'User 1' 1316 is associated with a 'Unfollow' icon 1324, a 'Message' icon 1326, a 'Plop' icon 1328, a count information 1330 depicting a total number of spots to be 350 k or 350000 and a 'Spots' icon 1332 depicting a preview of list of spots associated with the spotter 'User 1'. The spotter 'User 2' 1318 is associated with a 'Unfollow' icon 1334, a 'Message' icon 1336, a 'Plop' icon 1338, a count information 1340 depicting a total number of spots to be 200 k or 200000 and a 'Spots' icon 1342 depicting a preview of list of spots associated with the spotter 'User 2'.

In an embodiment, when the user may decide to unfollow a particular spotter and accordingly tap on the 'unfollow' icon. Once, the user has tapped/clicked on the 'unfollow' icon, the user may not receive any notifications or alerts associated with the unfollowed spotter until the user follows the spotter again. When the user wishes to send a message to a particular spotter, the user may tap the 'Message' icon 516, which provisions the user with a UI to view or send messages to the particular spotter. In an embodiment, the user may 'plop' (for example, poke, nudge or hint at) the spotters by tapping the 'plop' icon to spot or comment on the one or more words spotted by the user. In an embodiment, the 'Spots' icon is associated with a text box, which displays a preview of the spots associated with the spotter. When the user taps on the 'spots' icon, the text box associated with the 'spots' icon expands to display all the spots associated with the spotter in the same view. In some embodiments, when the user taps on the 'Spots' icon, a UI associated with the 'spots' icon, which includes a list of spots associated with the spotter is displayed to the user.

In an embodiment, when the user taps on any spotter from among the list of spotters, a UI associated with the tapped spotter including profile information about the spotter is provisioned to the user on the display 308 of the device 300. The UI 1300 further includes button 'Other Spotters' 1344 which may further be associated with a numeral (not shown in FIG. 13), which is configured to indicate a number of other spotters (for example, thirty) out of a total number of pages (for example, four) that may be displayed in the UI 1300. The button 'Other Spotters' 1344 is configured to load more spotters in the UI 1300 than those already displayed in the UI 1300.

In an embodiment, the 'Following' tab 1304 may include a list of spotters whose spotting activity is being followed by the user and the 'Friends' tab 1306 may include a list of spotters with whom the user has been associated with as friends. The user may tap or click on any of these desired tabs from among the plurality of tabs to view the list of spotters associated with each tab. In some embodiments, the icons, such as the 'Unfollow' icon, the 'Message' icon, the 'Plop' icon, the 'Total Spots' icon, and the 'Spots' icon may be provisioned with each spotter from among the list of spotters associated with each of these tabs. It is noted that in some embodiments, the UI 1300 associated with the 'Spotters' icon 514 may be associated with standard navigation options, such as horizontal swipes to navigate through the tabs and/or vertical swipes to load subsequent/previous available spots. The UI provisioned upon invoking the 'Search' icon 510 on the home page UI 500 of FIG. 5 is explained with reference to FIG. 14.

Figure 14:
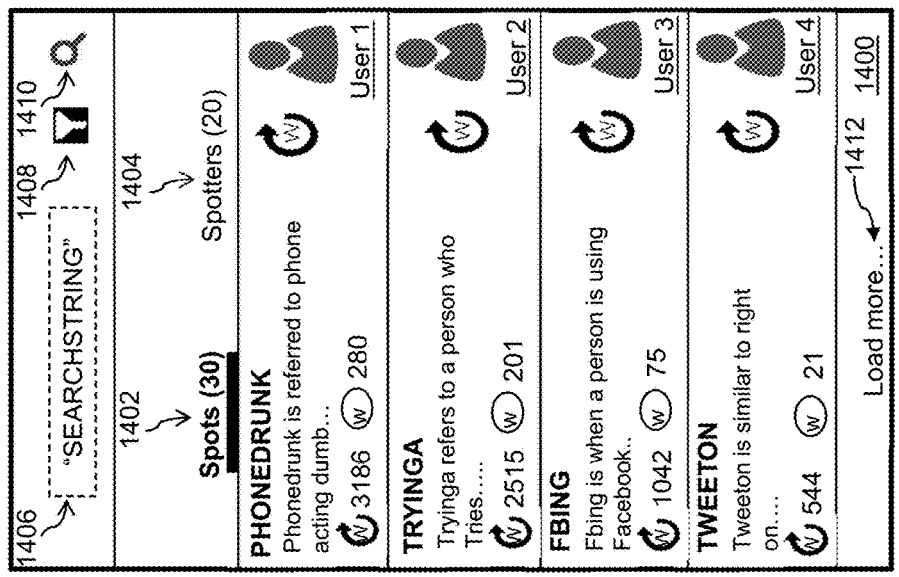
FIG. 14 illustrates a UI provisioned upon invoking the 'Search' icon on the home page UI in accordance with an embodiment.

FIG. 14 illustrates a UI 1400 provisioned upon invoking the 'Search' icon 510 on the home page UI 500 (explained with reference to FIG. 5), in accordance with an embodiment. The UI 1400 corresponding to the 'Search' icon 510 is provisioned to the user on the display 308 of the communication device 300. The UI 1400 corresponding to the 'Search' icon 510 is depicted to include tabs, such as a 'Spots' tab 1402, and a 'Spotters' tab 1404. Additionally, the UI 1400 is depicted to display a search editor 1406, a filter icon 1408 and a search icon 1410. In an embodiment, the search editor 1406 is configured to facilitate the user to provide a search string (depicted as "SEARCH STRING" in FIG. 14) for performing the search. In some embodiments, when the user starts typing the search string, a list of suggestions (not shown in FIG. 14) associated with the typed search string is provisioned to the user for selection. Accordingly, the list of suggestion may vary whenever the user changes the search string and the user may tap or click his/her desired suggestion. Upon entering the search string or selecting the suggestions provisioned to the user, the user may tap or click the search icon 1410 for performing the search. Upon tapping or clicking the search icon 1410, results (for example, Spots and Spotters) associated with the search string are provisioned to the user on the display 308. For example, a list of spots associated with the search string is listed under the 'Spots' tab 1402 and a list of spotters associated with the search string is listed under the 'Spotters' tab 1404. Each tab such as the 'Spots' tab 1402 and the 'Spotters' tab 1404 may be associated with a number indicating a number of spots and spotters that are available for the given search string. For example, if the spots tab is depicted as "Spots (30)", the number "30" indicates that there are 30 spots that are available in the list. Similarly, if the spotters tab is depicted as "Spotters (20)", the number "20" indicates that there are 20 spotters that are available in the list.

As depicted in FIG. 14, the 'Spots' tab 1402 is configured to display the list of spots associated with the search string, such as PHONEDRUNK', 'TRYINGA', 'FBING' and 'TWEETON'. Each of these spots is associated with a preview of textual description outlining a meaning of the respective spots as explained with reference to FIG. 13. Further, each of the spots is associated with a 're-spot' icon and an image thumbnail. The 're-spot' icon is configured to facilitate re-spotting or re-sharing of the associated spot. The image thumbnail corresponds to the remote user (i.e. spotter) who has recently shared the spot. Furthermore, each spot is depicted to be associated with count information indicating a total number of re-spots and a total number of related spots associated with the spot. The re-spot icon, the image thumbnail, and a count information indicating a total number of re-spots and a total number of related spots associated with the spot are explained with reference to FIG. 12 and are not explained herein for the sake of brevity. The UI 1400 further includes button load More' 1412, which is configured to load more recent spots in the UI 1400 than those already displayed in the UI 1400.

As explained above, the 'Spotters' tab 1404 is configured to display the list of spotters associated with the search string. The user may tap or click on any of these desired tabs from among the plurality of tabs to view the list of spots or spotters associated with the search string. The list of spotters under the 'Spotters' tab 1404 may display spotters associated with the search string, an image thumbnail associated with each spotter and a plurality of icons, such as a 'Unfollow' icon, a 'Message' icon, a 'Plop' icon, a 'Spots' icon, and a count information depicting a total number of spots as explained with reference to FIG. 13 and are not explained herein for the sake of brevity.

In an embodiment, the user may tap or click the filter icon 1408 for filtering the search results based on parameters, such as spotted from, spotted to, language, location, spotted at, tags, content filter, images and comments. In an embodiment, if the search string that is provided by the user in the search editor does not match with the spot/spotter from among the list of available spots or spotters, then the UI may be configured to display a message such as "There are no spots for 'Search String'!" or "Search result not found" or the like. It is understood that these messages are provided herein for illustration purposes and should not be considered limiting. It is noted that in some embodiments, the UI 1300 associated with the 'Spotters' icon 514 may be associated with standard navigation options, such as horizontal swipes to navigate through the tabs and/or vertical swipes to load subsequent/previous available spots. An exemplary UI depicting a spot profile corresponding to the spot Phonedrunk' is explained with reference to FIG. 15.

Figure 15:
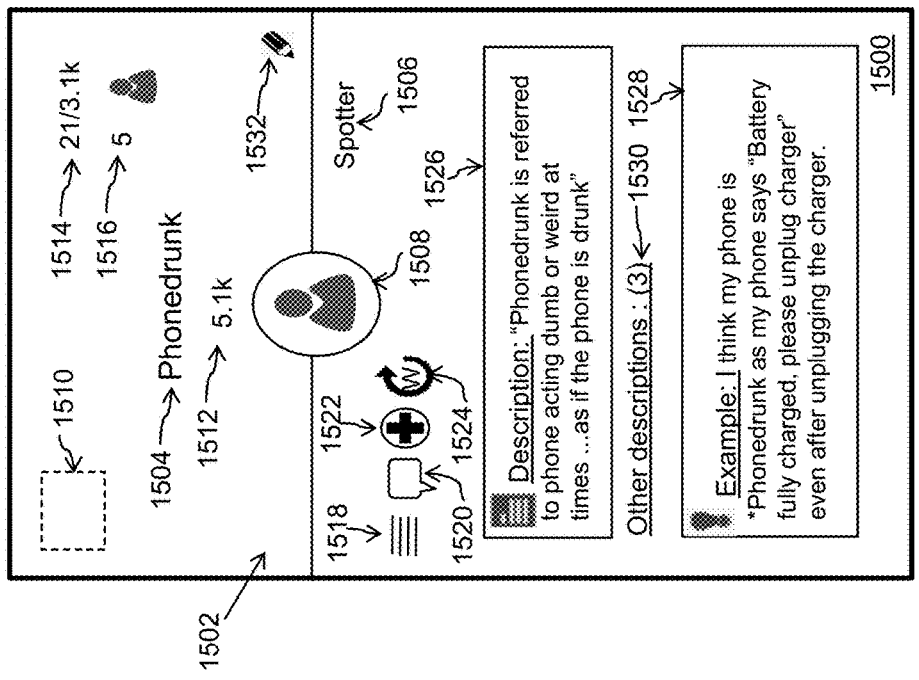
FIG. 15 illustrates an exemplary UI depicting a spot profile corresponding to the spot 'Phonedrunk' in accordance with an embodiment.

Referring now to FIG. 15, an exemplary UI 1500 depicting a spot profile 1502 corresponding to the spot 'Phonedrunk' 1504 is depicted in accordance with an embodiment. The UI 1500 may be displayed on the display 308 of the communication device 308. As explained above, each spot is associated with a spot profile, such as the spot profile 1502, in form of user-defined information including at least one of a meaning of the spot, an exemplary spot usage instance and a picture of a location where the spot was first encountered. In an embodiment, the UI 1500 may be configured to display a user defined snippet outlining a context for the spot 'Phonedrunk' 1504 and a spotter 1506 (associated with as an image 1508 in UI 1500) associated with the spot 'Phonedrunk' 1504 (hereinafter referred as spot 1504).

Further, the spot profile 1502 may display an application logo 1510 uniquely distinguishing the application from other applications in the communication device 300. Furthermore, the spot profile 1502 may display a number 1512 depicting a re-spot count associated with the spot 1504. The number 1512 is exemplarily depicted to be '5.1 k' or '5100' as a re-spot count for the spot 1504. The spot 1504 may also be associated with a number indicating a spot count among a total number of spots. In this example scenario, the spot 1504 is associated with a spot ratio 1514 depicted as '21/3.1' indicating the spot rank to be '21' from among '3.1 k' or '3100' total number of spots. The spot profile 1502 may also display a number 1516 indicating a number of mutual friends (exemplarily depicted to be '5' in UI 1500) associated with the spotter 1506 who have re-spotted the same spot 1504. It is understood that numeral values associated with numbers 1512, 1514 and 1516 are depicted herein for illustrative purposes only.

The spot profile 1502 is further configured to display four icons 1518, 1520, 1522 and 1524 for enabling a remote user to access more information for the spot 1504, to add a comment on the spot profile 1502, to add the spotter associated with the spot 1504 as a friend and to respot the spot 1502, respectively. When the remote user taps the icon 1518, a drop-down menu with a list of options such as, but not limited to, a related spots option, a timeline option, a share option and the like may be provisioned to the user. Upon tapping the related spots option, the remote user may be provisioned with a set of spots similar to the spot 1504. Further, the timeline option provides the remote user with the details such as a re-spot activity associated with the spot 1504 over different time intervals, such as a day or a week or a month or a year. The remote user may also tap the share option to share the spot 1504 with his/her friends or other remote users. When the remote user taps the icon 1520, a UI associated with the comment icon 1520 may be displayed to the remote user, where the remote user may view other comments associated with one or more remote users and/or add comments in the UI corresponding to the spot 1504. Furthermore, when the user taps the icon 1522, a UI associated with the icon 1522 may be displayed to the remote user, wherein the remote user may add a note and/or text to describe the meaning of the spot 1504 and/or add a note and/or text to describe an example usage of the spot 1504. When the user taps the re-spot icon 1524, the remote user is provided with an option to re-spot and in turn the re-spot count depicted in the number 1512 may get updated automatically. In an embodiment, the user may restrict access to the spot 1504 to one or more remote users, as the user may feel that the spot or its meaning includes content, which may be inappropriate for one or more remote users. Accordingly, the spotter 1506 may flag the spot 1504 as inappropriate to the one or more remote users.

In an embodiment, the UI 1500 is further configured to display two text boxes 1526 and 1528 outlining a meaning of the spotted word or phrase and an example usage of the spot, respectively. Accordingly, the text box 1526 depicts a meaning of the spot 'Phonedrunk' 1504 as follows: "Phonedrunk is referred to phone acting dumb or weird at times . . . as if the phone is drunk". Further, the text box illustrates an example way of using the word 'Phonedrunk' as "I think my phone is Phonedrunk as my phone says "Battery fully charged, please unplug charger" even after unplugging the charger." The text box 1526 may include only one meaning/description of the word 'Phonedrunk'. However, a link 'Other Descriptions' 1530 may be provided to provision access to other meanings of the word 'Phonedrunk' to the user. The link 'Other Descriptions' 1530 may display a number (depicted to be '3' in the UI 1500) for a total number of descriptions for the spot 1504 precluding the description in the text box 1526. The UI 1500 may further display an edit option 1532 for facilitating an editing of the meaning and/or example usage of the spot 1504.

Figure 16:
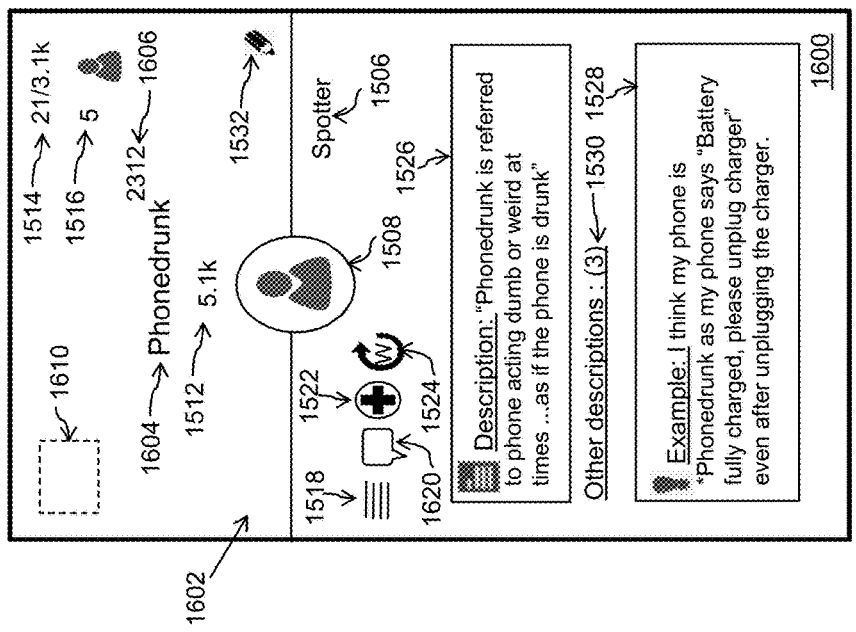
FIG. 16 illustrates an exemplary UI depicting the spot profile corresponding to the spot Phonedrunk' in accordance with another embodiment.

Referring now to FIG. 16, an exemplary UI 1600 illustrates a spot profile 1602 corresponding to the spot 'Phonedrunk' 1604 is depicted in accordance with an embodiment. The UI 1600 may be displayed on the display 308 of the communication device 308. The spot profile 1602 corresponding to the spot 'Phonedrunk' 1604 is substantially similar to the spot profile 1502 corresponding to the spot 'Phonedrunk' 1504. More specifically, the various components, such as those associated with numerals 1506-1532 are common to both the spot profiles 1502 and 1602 and are accordingly not described again herein.

The spot profile 1602 is configured to display a numeral 1606 (depicted as number "2132"), which is configured to indicate a combined count of a number of times (for example, "2132" times) the spot was shared as a spot and a re-spot in the one or more online communities of remote user. Though the numeral 1606 is depicted to be a superscript to the spot 'Phonedrunk' 1604, it is noted that the numeral 1606 may be associated in various positions, such as for example, as a subscript, with respect to the displayed spot 'Phonedrunk' 1604 on the spot profile 1602. In an embodiment, the numeral 1606 is further configured to include at least one of a number of comments associated with the shared spot, a number of comments associated with the re-spot and a number of instances of adding one of an image, textual content and video with the shared spot or re-spot in the combined count. Upon tapping on the numeral 1606, a UI displaying a break-up of the various components configuring the count associated with the numeral 1606 is provisioned to the user. In an embodiment, the breakup may include information corresponding to the identities of the spotters who have spotted/re-spotted/commented on the spot 'Phonedrunk' 1604 and the comments/content annotated to the spot 1604 and also description, images added to the spot 1604 in a timeline manner (by showing the recent activities at the top).

In an embodiment, the spot profiles, such as the spot profiles 1502 and 1602, are configured to be edited by other remote users from among the one or more online communities of remote users based on permissions afforded to the other remote users through the application.

Referring back to the application residing natively in the communication device 300, in some embodiments, UIs such as the UI 1200 and 1300 are configured to provision access to (1) a listing of currently trending spots among the one or more online communities of remote users, and (2) a listing of remote users from among the one or more remote users associated with the currently trending spots, respectively. Such UIs are further configured to enable the remote user to re-spot a word or a phrase from the listing of currently trending spots. The UIs, such as the UI 1200 and 1300 are also configured to enable the remote user to annotate the spots selected by other remote users from among the one or more online communities of remote users with one of comments and tags. Further, as explained with reference to FIG. 2, the application is further configured at least in part, to provision a voice input based option configured to convert one or more words read from a textual content source by the remote user into a textual format for facilitating the sharing of the word and the phrase as the spot.

Various techniques of spotting the words and/or phrases are explained in detail with reference to FIGS. 3 to 16. It is to be understood that the spotting of words based on English language as explained herein may not be considered limiting. Indeed the spotting of words/phrases may be extended to other languages as well. Another system, such as the system 200, for facilitating spotting of words and phrases is explained with reference to FIG. 17.

Figure 17:
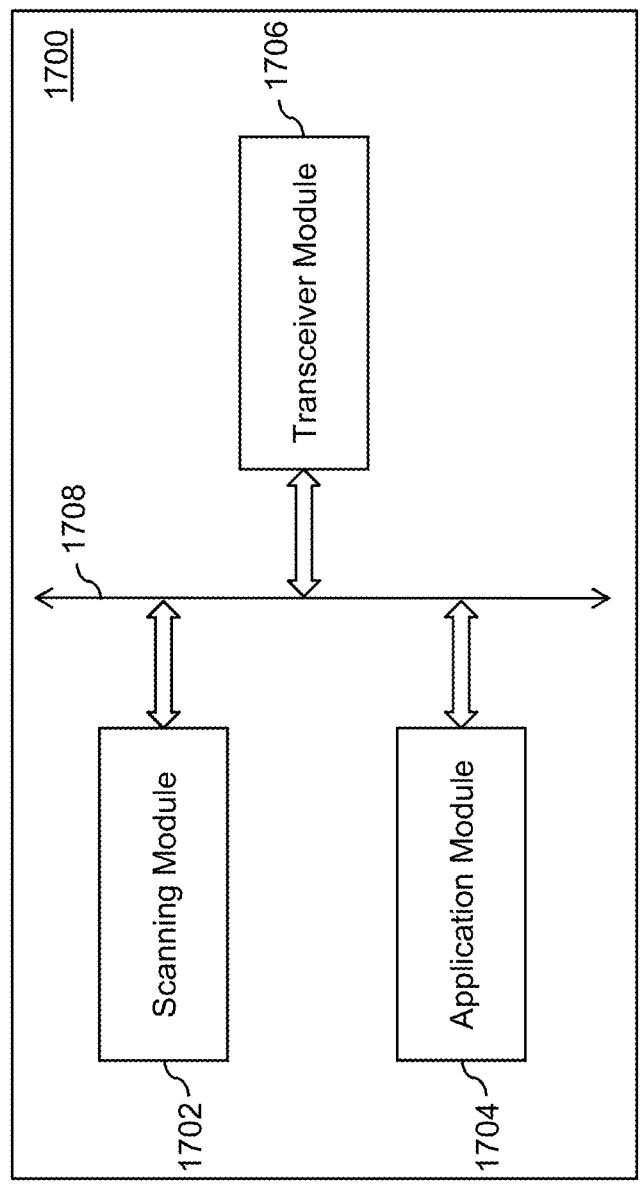
FIG. 17 is an exemplary block diagram of a system for facilitating spotting of words and/or phrases in accordance with another embodiment.

FIG. 17 is an exemplary block diagram of a system 1700 for facilitating spotting of words and/or phrases in accordance with another embodiment. As explained with reference to FIG. 2, the system 200 may be configured with fewer or more number of components than those depicted in FIG. 2. Accordingly, the system 1700 is depicted to include only a scanning module 1702, an application module 1704 and a transceiver module 1706. The scanning module 1702, the application module 1704 and the transceiver module 1706 may communicate with each other via bus 1708. Examples of the bus 1708 may include a data bus, an address bus, a serial bus and the like. It is noted that the system 1700 may include fewer or more components and that the components of system 1700 in FIG. 17 are depicted for illustrative purposes. In an embodiment, the various components of the system 1700, such as the scanning module 1702, the application module 1704, the transceiver module 1706, and the bus 1708 may be implemented as hardware, software, firmware or any combination thereof.

In an embodiment, the scanning module 1702 is configured to scan one or more user linked accounts (such as the user linked accounts explained with reference to FIG. 8) corresponding to remote users from among one or more online communities of remote users for detecting a presence of at least one pre-defined character embedded within their textual content. Examples of the linked accounts include, but are not limited to, social networking accounts, email accounts, blog accounts and the like. In an embodiment, the scanning module 1702, may detect the presence of one of a symbol, a letter and a mark representing the at least one pre-defined character which is embedded within the textual content corresponding to a linked account. In an embodiment, a pre-defined character from among the at least one pre-defined character is an asterisk ('*') symbol. For example, the textual content may include a phrase such as "I have been *Nick'ed again!" (implying being yelled at by Nick). The scanning module 1702 may scan the phrase and detect the presence of the asterisk symbol included therein. In some embodiments, the scanning module 1702 may be further configured to detect the presence of words disposed between two pre-defined characters from among the at least one pre-defined character as the phrase if the two pre-defined characters are detected within a pre-defined acceptable distance of each other. For example, the scanning module 1702 may scan a phrase such as "*I have been Nick'ed again!*" and detect the presence of words "I have been Nicked again!" disposed between two asterisk symbols within the pre-defined acceptable distance.

In an embodiment, the application module 1704 is communicably associated with the scanning module 1702 and configured to extract a word or a phrase disposed substantially adjacent to the at least one pre-defined character. In an embodiment, the application module 1704 is configured to extract the word immediately succeeding a detected pre-defined character from among the at least one pre-defined character. For example, consider the phrase "I have been *Nick'ed again!". The application module 1704 extracts the word "Nick'ed" upon detection of the asterisk symbol by the scanning module 1702. In an embodiment, the application module 1704 is configured to extract words disposed between two detected pre-defined characters from among the at least one pre-defined character as the phrase if the two detected pre-defined characters are detected within a pre-defined acceptable distance of each other.

In another example, consider the phrase "*I have been Nick'ed again!*", here the application module 1704 is configured to extract the phrase within two asterisk symbols detected by the scanning module 1702 within the pre-defined acceptable distance. The pre-defined acceptable distance may be defined in terms of a number of words, for example 0-4 words and the like. The phrase "I have been Nick'ed again!" is disposed between the two asterisk symbols is extracted by the application module 1704 and is considered as spot. In an embodiment, the application module 1704 is configured to extract the word immediately succeeding two pre-defined characters disposed next to each other for facilitating subsequent provisioning or automatic selection of the word as the re-spot. In such a scenario, remote user sharing a word or phrase as a spot, which has already been spotted by other one or more remote users is considered as the re-spot. Such re-spots may be stored in a list of spots within a spotting dictionary, such as the spotting dictionary associated with the dictionary generation module 208 in FIG. 2. For example, consider a spot "Fbing". The application module 1704 extracts the word immediately succeeding two asterisk symbols as the re-spot, in this case, the word "Fbing" is extracted upon detection of the two asterisk symbols by the scanning module 1702** and is considered as a re-spot.

In an embodiment, the transceiver module 1706 is communicably associated with the application module 1704 and is configured to perform provisioning of the word or the phrase for user selection as one of a spot and a re-spot. For example, the transceiver module 1706 may provision the word or the phrase to a communication device, such as the communication device 300, associated with a remote user. The remote user may select the word or the phrase as a spot or a re-spot based on the remote user's interest. As explained above, the selection of the word or the phrase as the spot is indicative of the user interest in sharing the word or the phrase among the one or more online communities of remote user. Furthermore, the selection of the word or the phrase as the re-spot is indicative of user interest in sharing a spotted word or spotted phrase by another phrase among the one or more online communities of remote user.

In an embodiment, the transceiver module 1706 is further configured to facilitate automatic selection of the word or the phrase as one of the spot and the re-spot. It is understood that the transceiver module 1706 may facilitate the communication device to select the word or the phrase as one of the spot and the re-spot automatically and/or the remote user may select the word or phrase manually as one of the spot and the re-spot.

In an embodiment, the transceiver module 1706 may receive the selection of a word or a phrase as a spot from a communication device associated with the remote user, and search the received word or the phrase in a list of words and phrases stored in the spotting dictionary. If the word or the phrase is found among the list of words and phrases in the spotting dictionary during the search by the transceiver module 1706, the word or the phrase is considered as the re-spot. If the word or phrase is not found in the list of words and phrases in the spotting dictionary during the search by the transceiver module 1706, the word or the phrase is considered as a new spot and may be included in the list of words and phrases in the spotting dictionary. The list of words or phrases in the spotting dictionary may be provisioned to the communication device 300 associated with the remote user by the transceiver module 1706 and the search for the word or the phrase as the spot or the re-spot may be done manually by the remote user. A method for facilitating the spotting of words and phrases is explained with reference to FIG. 18.

Figure 18:
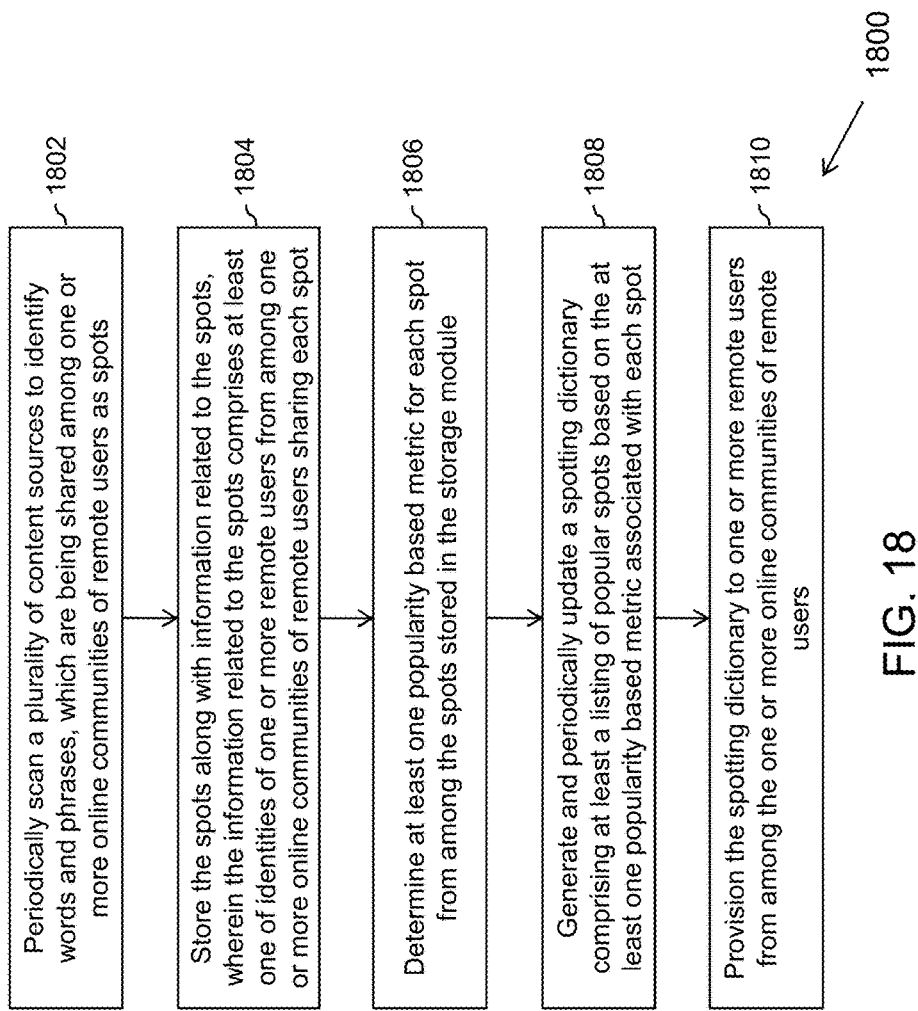
FIG. 18 illustrates a flow diagram of an exemplary method for facilitating spotting of words and/or phrases in accordance with an embodiment.

FIG. 18 is a flow diagram depicting an exemplary method 1800 for facilitating spotting of words and phrases, in accordance with an embodiment. The method 1800 depicted in the flow diagram may be executed by, for example, the system 200 explained with reference to FIG. 2. Operations of the flowchart, and combinations of operation in the flowchart, may be implemented by, for example, hardware, firmware, a processor, circuitry and/or a different device associated with the execution of software that includes one or more computer program instructions. The operations of the method 1800 are described herein with help of the system 200. However, the operations of the method 1800 can be described and/or practiced by using a system other than the system 200. The method 1800 starts at operation 1802.

At operation 1802, a plurality of content sources is periodically scanned (for example, by the scanning module 202 of the system 200) to identify words and phrases, which are being shared as spots among one or more online communities of remote users. As explained above, the word or the phrase being shared as the spot by the remote user is one of a word or a phrase coined by the remote user word or the phrase being shared as the spot by the remote user is one of a word or a phrase coined by the remote user, a word or a phrase coined by another remote user in the online community, a word or a phrase encountered for a first time by the remote user on one of an online content source and an offline content source, and a known word or phrase associated with a new usage for the remote user. The periodic scanning of the plurality of content sources may also include identifying potential spots as explained with reference to FIG. 2 and is not explained herein for the sake of brevity.

At operation 1804, the spots and/or potential spots along with information related to the spots are stored (for example, in the storage module 204 of the system 200). The information related to the spots comprises at least one of identities of one or more remote users from among one or more online communities of remote users sharing each spot, a contextual information associated with each spot and online user comments associated with each spot. At operation 1806, at least one popularity-based metric for each spot/potential spot from among the stored spots is determined (for example, by the computation module 206 of the system 200). The storing of the spots along with related information of the spots/potential spots, and determining the at least one popularity-based metric are explained with reference to FIG. 2 and are not explained herein for the sake of brevity.

At operation 1808, a spotting dictionary comprising at least a listing of popular spots is generated and periodically updated (for example, by the dictionary generation module 210 of the system 200) based on the at least one popularity-based metric associated with each spot. The spotting dictionary is configured to be integrated with one or more word dictionaries and facilitate provisioning of the popular spots as word completions, word suggestions and next word predictions during instances of user text entry. At operation 1810, the spotting dictionary is provisioned to one or more remote users from among the one or more online communities of remote users (for example, by the transceiver module 212 of the system 200). The generation and periodic updation of the spotting dictionary and provisioning of the spotting dictionary to the one or more remote users are explained with reference to FIG. 2 and are not explained herein.

Without in any way limiting the scope, interpretation, or application of the claims appearing below, advantages of one or more of the exemplary embodiments disclosed herein include enabling users of communication devices to keep abreast of new words, phrases, jargons and/or slangs being added to the conversational language on a daily basis. Further, the integration of the spotting dictionary with other dictionaries in the communication device aids in word/ phrase completions, word/phrase suggestions and next word predictions during instances of user text entry, which further assists in keeping the text entry means updated and render it convenient for use in text-based communication vis-à-vis' the latest word or phrase additions to the conversation language. In an embodiment, interactive web-based application may also serve as stand-alone social network for a plurality of users.

In an embodiment, the interactive web application maybe configured to be integrated into a keyboard of the user's device as a plug-in or a form of source code. A spot bar (similar to suggestion bar in prediction keyboards) may then be displayed on top of the keyboard. Further, a spot icon may be provisioned on either side of the spot bar. User can enter a word/phrase (which will be displayed in spot bar) and tap on the spot icon to automatically spot the word of user's interest. In another embodiment, a user can type a pre-defined syntax/character followed by a word/phrase to spot automatically, or, a pre-defined syntax/character followed by a word/phrase and ends again with the same pre-defined character to respot the word/phrase automatically. In an embodiment, if a keyboard is associated with predictive capability and includes a suggestion bar on top of the keyboard, which shows at least 2 suggestions based on the user input, then one word may be suggested by the web based application. The user may tapping on this suggestion to spot the word and can place the word on the user's profile automatically. In an embodiment, the word suggestion may be facilitated based on the quantitative and qualitative data as explained above. In another embodiment, a spot widget may also be provisioned for enabling the user to directly enter a word/phrase for spotting purposes.

Although the present technology has been described with reference to specific exemplary embodiments, it is noted that various modifications and changes may be made to these embodiments without departing from the broad spirit and scope of the present technology. For example, the various blocks, modules, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the system 200 and the system 1700 may be enabled using software and/or using transistors, logic gates, and electrical circuits (for example, integrated circuit circuitry such as ASIC circuitry). Various embodiments of the present disclosure may include one or more computer programs stored or otherwise embodied on a computer-readable medium, wherein the computer programs are configured to cause an apparatus (like the communication device 300) or computer to perform one or more operations (for example, operations related to facilitating accessing and integrating the spotting dictionary and the interactive web application into the apparatus as explained above). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon or subsequent to studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology. Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system comprising:
   a scanning module configured to periodically scan a plurality of content sources to identify words and phrases, which are being shared among one or more online communities of remote users as spots, wherein sharing of a word or a phrase as a spot by a remote user in an online community from among the one or more online communities of remote users is indicative of user interest in the word or the phrase;
   a storage module communicably associated with the scanning module and configured to store the spots along with information related to the spots, wherein the information related to the spots comprises at least one of identities of remote users from among the one or more online communities of remote users sharing each spot, a contextual information associated with each spot and online user comments associated with each spot;
   a computation module communicably associated with the storage module and configured to determine at least one popularity-based metric for each spot from among the spots stored in the storage module;
   a dictionary generation module communicably associated with the computation module and configured to generate and periodically update a spotting dictionary comprising at least a listing of popular spots based on the at least one popularity-based metric associated with each spot;
   a transceiver module communicably associated with the dictionary generation module and configured to provision the spotting dictionary to one or more remote users from among the one or more online communities of remote users; and
   an application module configured to facilitate creation of an interactive web-based application capable of residing natively in a user device associated with the remote user, the web-based application comprising a plurality of user interfaces (UIs) configured to facilitate the sharing of the word or the phrase as the spot.

2. The system according to claim 1, wherein the word or the phrase being shared as the spot by the remote user is one of a word or a phrase coined by the remote user, a word or a phrase coined by another remote user in the online community, a word or a phrase encountered for a first time by the remote user on one of an online content source and an offline content source, and a known word or phrase associated with a new usage for the remote user.

3. The system according to claim 1, wherein the computation module is further configured to compute one or more parameters for each spot, wherein a parameter from among the one or more parameters is one of:
   a total number of times the each spot is being shared in the one or more online communities of remote users;
   a total number of separate instances of sharing the each spot as a new spot by different remote users within the one or more online communities of remote users;
   a total number of times the each spot is being re-spotted within the one or more online communities of remote users subsequent to sharing the each spot by a remote user;
   a popularity parameter signifying a measure of popularity of each remote user involved in sharing the each spot within the one or more online communities of remote users;
   a total number of comments associated with the each spot;
   a total number of recent comments associated with the each spot;
   a total number of recent re-spots associated with each spot; and
   a profile parameter configured to account for user additions of at least one of textual content and image content to a spot profile associated with each spot.

4. The system according to claim 1, wherein the spotting dictionary is configured to be integrated with one or more word dictionaries and facilitate provisioning of the popular spots as word completions, phrase completions, word suggestions, phrase suggestions and next word predictions during instances of user text entry.

5. The system according to claim 1, wherein the scanning module is configured to scan one or more user linked accounts corresponding to a remote user from among the one or more online communities of remote users for detecting a presence of at least one pre-defined character embedded within online textual content, and to extract a word or a phrase disposed substantially adjacent to the at least one pre-defined character as a spot.

6. The system according to claim 1, wherein another UI from among the plurality of UIs is configured to display the spot among a listing of words and phrases selected as spots by the remote user.

7. The system according to claim 6, wherein one or more spots from among the spots selected by the remote user comprise an associated spot profile in form of user-defined information including at least one of a meaning of the spot, an exemplary spot usage instance and a picture of a location where the spot was first encountered.

8. The system according to claim 7, wherein the spot profile is configured to display a numeral associated with the spot, wherein the numeral is indicative of atleast one of a combined count of a number of times the spot was shared as a spot, a re-spot in the one or more online communities of remote users, a number of comments associated with the shared spot, a number of comments associated with the re-spot and a number of instances of adding one of an image, textual content and video with the shared spot or re-spot in the combined count.

9. The system according to claim 7, wherein the associated spot profile is configured to be edited by other remote users from among the one or more online communities of remote users based on permissions afforded to the other remote users through the web-based application.

10. The system according to claim 1, wherein the web-based application is configured to provision an option within a set of clipboard options associated with a highlighted portion of text corresponding to one of an online textual content source and an offline textual content source, the option configured to enable a selection of the highlighted portion of the text as the spot.

11. The system according to claim 1, wherein at least one UI from among the plurality of UIs is configured to provision access to one of:
a listing of currently trending spots among the one or more online communities of remote users; and
a listing of remote users from among the one or more remote users associated with the currently trending spots.

12. The system according to claim 11, wherein the at least one UI is further configured to enable the remote user to re-spot a word or a phrase from the listing of currently trending spots, wherein re-spotting of the word or the phrase is indicative of selecting a spotted word or phrase for subsequent sharing as the spot.

13. The system according to claim 11, wherein the at least one UI is further configured to enable the remote user to annotate the spots selected by other remote users from among the one or more online communities of remote users with one of comments and tags.

14. The system according to claim 1, wherein the web-based application is configured to be linked to one or more user accounts on social networking websites associated with the remote user and to prompt the remote user, during text entry on the one or more user accounts on social networking websites, to append the word or the phase with at least one pre-defined character to indicate a selection of the word or the phrase as the spot.

15. The system according to claim 1, wherein the web-based application is configured to be linked to one or more user accounts on social networking websites associated with the remote user and to extract words or phrases appended with at least one pre-defined character within online textual content corresponding to the one or more user accounts on social networking websites and provision the extracted words and phrases as candidates for subsequent selection of the words or the phrases as spots.

16. The system according to claim 1, wherein the web-based application is further configured at least in part, to provision a voice input based option configured to convert one or more words read from a textual content source by the remote user into a textual format for facilitating the sharing of the word and the phrase as the spot.

17. The system according to claim 1, wherein the scanning module is further configured to periodically scan the plurality of content sources to identify potential spots, wherein a potential spot from among the potential spots corresponds to one of a word and a phrase identified with potential of being shared as a spot.

18. The system according to claim 17, wherein the scanning module is configured to identify the potential spot based on related information comprising at least one of temporal and spatial information of content in vicinity of the potential spot, presence of significant words in the content in vicinity of the potential spot, contextual information and semantic sense associated with the potential spot and the associated content, etymological and ontological inferences corresponding to the potential spot, identified sentiment associated with the potential spot, identified context based on grammar extraction corresponding to the potential spot, location source associated with the potential spot and information to qualify and quantify a relevance of the potential spot.

19. The system according to claim 18, wherein the potential spots are stored in the storage module along with the related information, and, wherein the at least one popularity-based metric is computed for each potential spot for determining a subsequent inclusion of the each potential spot in the spotting dictionary as a popular spot.

20. The system according to claim 18, wherein the information related to the spots and the related information corresponding to the potential spots stored in the storage module is configured to facilitate in provisioning the one or more remote users with recommendations comprising related spots and related content during instances of user text entry.

21. The system according to claim 20, wherein the spotting dictionary is configured to include quantitative data and qualitative data corresponding to the popular spots, wherein the quantitative data and qualitative data comprises statistical information relating to a popular spot's historical usage or selection, probability information relating to a popular spot's historical usage, run-time analytics information and a dictionary priority information.

22. The system as claimed in claim 20, wherein the qualitative data and qualitative data is configured to facilitate in appropriate provisioning of the popular spots as word completions, phrase completions, word suggestions, phrase suggestions and next word predictions during instances of user text entry.

23. A method comprising:
periodically scanning a plurality of content sources to identify words and phrases being shared among one or more online communities of remote users as spots, wherein sharing of a word or a phrase as a spot by a remote user in an online community from among the one or more online communities of remote users is indicative of user interest in the word or the phrase;

storing the spots along with information related to the spots, wherein the information related to the spots comprises at least one of identities of one or more remote users from among the one or more online communities of remote users sharing each spot, a contextual information associated with each one of the spots and online user comments associated with each one of the spots;

determining at least one popularity-based metric for each spot from among the spots stored in the storage module;

generating and periodically updating a spotting dictionary comprising at least a listing of popular spots based on the at least one popularity-based metric associated with each spot;

provisioning the spotting dictionary to one or more remote users from among the one or more online communities of remote users; and facilitating creation of an interactive web-based application capable of residing natively in a user-device associated with the remote users, the web-based application comprising a plurality of user interfaces (UIs) configured to facilitate the sharing of the word or the phrase as the spot.

24. The method according to claim 23, further comprising computing one or more parameters for each spot, wherein a parameter from among the one or more parameters is one of:
a total number of times the each spot is being shared in the one or more online communities of remote users;
a total number of separate instances of sharing the each spot as a new spot by different remote users within the one or more online communities of remote users;
a total number of times the each spot is being re-spotted within the one or more online communities of remote users subsequent to sharing the each spot by a remote user;
a popularity parameter signifying a measure of popularity of each remote user involved in sharing the each spot within the one or more online communities of remote users;
a total number of comments associated with the each spot;
a total number of recent comments associated with the each spot;
a total number of recent re-spots associated with each spot; and
a profile parameter configured to account for user additions of at least one of textual content and image content to a spot profile associated with each spot.

25. The method according to claim 23, wherein the spotting dictionary is configured to be integrated with one or more word dictionaries and facilitate provisioning of the popular spots as word completions, phrase completions, word suggestions, phrase suggestions and next word predictions during instances of user text entry.

26. The method according to claim 23, further comprising scanning one or more user linked accounts corresponding to a remote user from among the one or more online communities of remote users for detecting a presence of at least one pre-defined character embedded within online textual content, and, to extract a word or a phrase disposed substantially adjacent to at least one pre-defined character as a spot.

27. The method according to claim 23, wherein another UI from among the plurality of UIs is configured to display the spot among a listing of words and phrases selected as spots by the remote user.

28. The method according to claim 27, wherein one or more spots from among the spots selected by the remote user comprise an associated spot profile in form of user-defined information including at least one of a meaning of the spot, an exemplary spot usage instance and a picture of a location where the spot was first encountered.

29. The method according to claim 28, wherein the spot profile is configured to display a numeral associated with the spot, wherein the numeral is indicative of atleast one of a combined count of a number of times the spot was shared as a spot, a re-spot in the one or more online communities of remote user, a number of comments associated with the shared spot, a number of comments associated with the re-spot and a number of instances of adding one of an image, textual content and video with the shared spot or re-spot in the combined count.

30. The method according to claim 28, wherein the associated spot profile is configured to be edited by other remote users from among the one or more online communities of remote users based on permissions afforded to the other remote users through the web-based application.

31. The method according to claim 23, wherein the web-based application is configured to provision an option within a set of clipboard options associated with a highlighted portion of text corresponding to one of an online textual content source and an offline textual content source, the option configured to enable a selection of the highlighted portion of the text as the spot.

32. The method according to claim 23, wherein at least one UI from among the plurality of UIs is configured to provision access to one of:
listing of currently trending spots among the one or more online communities of remote users; and
listing of remote users from among the one or more remote users associated with the currently trending spots.

33. The method according to claim 32, wherein the at least one UI is further configured to enable the remote user to re-spot a word or a phrase from the listing of currently trending spots, wherein re-spotting of the word or the phrase is indicative of selecting a spotted word or phrase for subsequent sharing as the spot.

34. The method according to claim 23, wherein the web-based application is configured to be linked to one or more user accounts on social networking websites associated with the remote user and to prompt the remote user, during text entry on the one or more user accounts on social networking websites, to append the word or the phase with at least one pre-defined character to indicate a selection of the word or the phrase as the spot.

35. The method according to claim 23, wherein the web-based application is configured to be linked to one or more user accounts on social networking websites associated with the remote user and to extract words or phrases appended with at least one pre-defined character within online textual content corresponding to the one or more user accounts on social networking websites and provision the extracted words and phrases as candidates for subsequent selection of the words or the phrases as spots.

36. The system according to claim 1, wherein the spot is based on one of the user by self-cognizance or a suggestion as a candidate to be the spot.

37. The method according to claim 23, wherein the spot is based on one of the user self-cognizance or a suggestion as a candidate to be the spot.

* * * * *